(12) United States Patent
Sakakibara

(10) Patent No.: US 8,500,527 B2
(45) Date of Patent: Aug. 6, 2013

(54) AIR OUTLET STRUCTURE FOR AIR CONDITIONER

(75) Inventor: Kimio Sakakibara, Nishio (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1277 days.

(21) Appl. No.: 12/301,920

(22) PCT Filed: May 22, 2007

(86) PCT No.: PCT/JP2007/060467
§ 371 (c)(1),
(2), (4) Date: Nov. 21, 2008

(87) PCT Pub. No.: WO2007/136076
PCT Pub. Date: Nov. 29, 2007

(65) Prior Publication Data
US 2010/0261422 A1    Oct. 14, 2010

(30) Foreign Application Priority Data

May 23, 2006 (JP) .................................. 2006-143055
Jan. 12, 2007 (JP) .................................. 2007-004229

(51) Int. Cl.
*B60H 1/242* (2006.01)
(52) U.S. Cl.
USPC .......................................... 454/155; 454/152
(58) Field of Classification Search
USPC ........................................ 454/152, 155, 109
See application file for complete search history.

(56) References Cited

U.S. PATENT DOCUMENTS 2,367,104 A * 1/1945 Demuth ......................... 454/312
3,082,676 A * 3/1963 Church et al. ................. 454/303
(Continued)

FOREIGN PATENT DOCUMENTS

DE    3001163    7/1981
DE    19943822    3/2001
(Continued)

OTHER PUBLICATIONS

Extended European Search Report for EP Appl. No. 07743901.6 dated Feb. 17, 2010.

*Primary Examiner* — Steven B McAllister
*Assistant Examiner* — Frances H Kamps
(74) *Attorney, Agent, or Firm* — Finnegan, Henderson, Farabow, Garrett & Dunner, LLP

(57) ABSTRACT

An air outlet structure for an air conditioner, which can provide a sufficient volume and speed of air conditioning airflow, which has excellent directivity, and which has a thin air outlet directed to the interior of a vehicle. In the air outlet structure (10) for an air conditioner, a movable flow path member (14) provided in a case (12) can be deformed to a triangle and to a pentagon according to operation of a left-right adjustment knob (44), and this changes the shape of a flow path in the case (12). Accordingly, the flow path in the case (12) does not require fins for changing the direction of the left and right. As a result, the flow path in the case (12) can have a sufficient effective cross-sectional area to provide a sufficient volume and speed of air conditioning airflow. Further, changing the shape of the flow path itself within the case (12) enables control of the direction of air conditioning airflow from an air outlet (74), and as a result, air conditioning airflow having excellent directivity can be obtained. Also, since the flow in the case (12) has the sufficient effective cross-sectional area, the air outlet (74) for the vehicle interior is thinner in the vertical or left-right direction of the vehicle.

2 Claims, 21 Drawing Sheets

U.S. PATENT DOCUMENTS

| | | | | |
|---|---|---|---|---|
| 3,159,179 | A * | 12/1964 | De Lain | 137/545 |
| 3,299,797 | A * | 1/1967 | Dry | 454/295 |
| 4,077,310 | A * | 3/1978 | McCabe et al. | 454/303 |
| 5,147,243 | A * | 9/1992 | Inglis et al. | 454/323 |
| 6,527,194 | B1 * | 3/2003 | Burke | 236/49.3 |
| 6,607,433 | B2 * | 8/2003 | Vincent | 454/143 |
| 6,669,549 | B2 * | 12/2003 | Uemura et al. | 454/156 |
| 6,805,624 | B2 * | 10/2004 | Currle et al. | 454/152 |
| 7,000,634 | B2 * | 2/2006 | Lindborg | 137/625.3 |
| 7,302,959 | B2 * | 12/2007 | Gonia | 137/2 |
| 7,326,108 | B2 * | 2/2008 | Matthews et al. | 454/259 |
| 7,597,616 | B2 * | 10/2009 | Browne et al. | 454/155 |
| 2003/0232590 | A1 * | 12/2003 | Okumura et al. | 454/121 |
| 2004/0033776 | A1 * | 2/2004 | Currle et al. | 454/284 |
| 2006/0201273 | A1 * | 9/2006 | Beckley | 74/473.3 |
| 2010/0178863 | A1 * | 7/2010 | Coward | 454/333 |

FOREIGN PATENT DOCUMENTS

| | | |
|---|---|---|
| EP | 0 479 734 | 4/1992 |
| EP | 1457370 | 9/2004 |
| JP | 5-66447 | 9/1993 |
| JP | 5-83651 | 11/1993 |
| JP | 5-83652 | 11/1993 |
| JP | 5-332607 | 12/1993 |
| JP | 2001-280682 | 10/2001 |
| JP | 2005-306224 | 11/2005 |

* cited by examiner

AIR OUTLET STRUCTURE FOR AIR CONDITIONER

CROSS-REFERENCE TO RELATED APPLICATIONS

This application is a national phase application of International Application No. PCT/JP2007/060467, filed May 22, 2007, and claims the priority of Japanese Application Nos. 2006-143055, filed May 23, 2006 and 2007-004229, filed Jan. 12, 2007, the contents of all of which are incorporated herein by reference.

TECHNICAL FIELD

The present invention relates to an air outlet structure for an air conditioner, and particularly to an air outlet structure for an air conditioner that is provided with a structure capable of changing a blowing direction of an air conditioning airflow that is being blown out from an air outlet in the interior of a vehicle.

BACKGROUND ART

Heretofore, the following structure has been known as an air outlet structure for this kind of air conditioner (see, for example, Patent Reference 1). For example, in Patent Reference 1, an example of an air conditioning resistor is disclosed. In the example recited in Patent Reference 1, a retainer is provided, of which a downstream end that is open to serve as an air outlet configured to blow an air conditioning airflow into the interior of a vehicle. Plural fins are provided at the air outlet into the interior of the vehicle of this retainer. In this example, an angle of the plural fins is changed, and thus a structure is formed that blows an air conditioning airflow out from the air outlet inside the vehicle in a direction corresponding to this angle.

Patent Reference 1: Japanese Patent Application Laid-Open (JP-A) No. 2005-306224
Patent Reference 2: JP-A No. H5-332607
Patent Reference 3: Japanese Utility Model Application Laid-Open (JP-U) No. H5-83652

DISCLOSURE OF INVENTION

Problem to be Solved by the Invention

However, with the air outlet structure that is provided with plural fins at the air outlet of the retainer into the interior of the vehicle as described above, the plural fins are disposed in a flow path. Therefore, an actual outlet area of the air outlet into the vehicle interior is reduced by the fins. Moreover, when the fins are maximally angled to change the direction of the air conditioning airflow, a region is formed in which the air conditioning airflow in the flow path is held back by a fin, of the plural fins, that is disposed close to a flow path wall surface, and the actual outlet area of the air outlet into the vehicle interior is reduced. Accordingly, because the actual outlet area of the air outlet into the vehicle interior is reduced, a volume and speed of the air conditioning airflow are insufficient.

In contrast, to have sufficient volume and speed of an air conditioning airflow, it is necessary to enlarge the air outlet of the retainer into the vehicle interior. However, if an air outlet into the interior of a vehicle is enlarged, it is difficult to form the air outlet into the vehicle interior into a structure that is thin in a vertical direction of the vehicle and in a left-right direction of the vehicle. In particular, the employment of instrument panels having a slant (inclination) has been an increasing trend in recent years. Therefore, an air outlet structure for an air conditioner is desired that both has an air outlet into the interior of a vehicle being a thin structure to improve a degree of freedom of design of instrument panels, and is excellent in directivity of an air conditioning airflow.

The present invention has been devised in consideration of the circumstances described above, and an object is to provide an air outlet structure for an air conditioner that both sufficiently assures volume and speed of an air conditioning airflow and is excellent in directivity, and that also enables an air outlet into the interior of a vehicle to be a thin structure.

Means for Solving the Problem

In order to solve the problem described above, in an aspect an air outlet structure for the air conditioner includes: a flow path member having a downstream end that is open to serve as an air outlet configured to blow an air conditioning airflow to a vehicle interior; and a movable flow path member that is provided inside the flow path member, which changes a shape of a flow path in the flow path member by receiving a control force and is displaced in a direction orthogonal to a direction of flow of the flow path member while deforming, and causes the air conditioning airflow to blow from the air outlet in a direction corresponding to the shape of the flow path.

In an aspect of the air outlet structure for the air conditioner, when the air conditioning airflow is blown out from the air conditioner, the air conditioning airflow passes along the flow path member and is blown out from the air outlet into the interior of the vehicle. Herein, within the flow path member, the movable flow path member is provided, which is capable of receiving, for example, a control force from an occupant and wholly displacing in the direction orthogonal to the direction of flow of the flow path member while deforming. This movable flow path member is a structure that, by wholly displacing in the direction orthogonal to the direction of flow of the flow path member while deforming, changes the shape of the flow path within the flow path member, and causes the air conditioning airflow to blow from the vehicle interior outlet in a direction corresponding to the shape of the above-mentioned flow path. Therefore, when the air conditioning airflow is blown out from the air conditioner, if a control force is applied and the shape of the movable flow path member is changed, the air conditioning airflow from the air conditioner is blown out from the vehicle interior air outlet in a direction corresponding to the shape of the flow path within the flow path member, which has been deformed by the movable flow path member.

According to an aspect of the air outlet structure for the air conditioner, because the shape of the flow path itself within the flow path member is changed by the movable flow path member provided in the flow path member receiving a control force, there is no need to provide a plurality fins for changing the blowing direction in the flow path in the flow path member. Therefore, the effective cross-sectional area of the flow path in the flow path member can be ensured, and volume and speed of the air conditioning airflow can be sufficiently ensured. Further, because the blowing direction from the vehicle interior air outlet of the air conditioner can be controlled by changing the shape of the flow path itself within the flow path member, an air conditioning airflow with excellent directivity can be obtained. Moreover, because the effective cross-sectional area of the flow path in the flow path member can be ensured as described above, the air outlet into the vehicle interior can be given a thinner structure than conventional air outlets. Accordingly, a degree of freedom of design in instrument panels can be raised.

Further, in order to solve the problem described above, in another aspect an air outlet structure for the air conditioner includes: a flow path member having a downstream end that is open to serve as an air outlet capable of configured to blow an air conditioning airflow to a vehicle interior; and a movable flow path member that is provided inside the flow path member, which changes a shape of a flow path in the flow path member by receiving a control force at each of an upstream side portion and a downstream side portion of the movable flow path member and deform, and causes the air conditioning airflow to blow from the air outlet in a direction corresponding to the shape of the flow path.

In another aspect of the air outlet structure for the air conditioner, when the air conditioning airflow is blown out from the air conditioner, the air conditioning airflow passes along the flow path member and is blown out from the air outlet into the interior of the vehicle. Herein, the movable flow path member is provided within the flow path member. The movable flow path member is capable of receiving, for example, a control force from an occupant at each of the upstream side portion and the downstream side portion and wholly deforming. This movable flow path member is a structure that, by receiving the operation force from the occupant at each of the upstream side portion and the downstream side portion and wholly deforming, changes the shape of the flow path within the flow path member, and causes the air conditioning airflow to blow out in a direction corresponding to the shape of the above-mentioned flow path. Therefore, when the air conditioning airflow is blown out from the air conditioner, if a control force is applied and the shape of the movable flow path member is changed, the air conditioning airflow from the air conditioner is blown out from the vehicle interior air outlet in a direction corresponding to the shape of the flow path within the flow path member, which has been deformed by the movable flow path member. According to another aspect of the air outlet structure for an air conditioner, because the shape of the flow path itself within the flow path member is changed by the movable flow path member provided in the flow path member receiving a control force, there is no need to provide a plurality fins for changing the blowing direction in the flow path in the flow path member. Therefore, the effective cross-sectional area of the flow path in the flow path member can be ensured, and volume and speed of the air conditioning airflow can be sufficiently ensured. Further, because the blowing direction from the vehicle interior air outlet of the air conditioner can be controlled by changing the shape of the flow path itself within the flow path member, an air conditioning airflow with excellent directivity can be obtained. Moreover, because the effective cross-sectional area of the flow path in the flow path member can be ensured as described above, the air outlet into the vehicle interior can be given a thinner structure than conventional air outlets. Accordingly, a degree of freedom of design in instrument panels can be raised.

In yet another aspect of the air outlet structure for an air conditioner, the movable flow path member of the air outlet structure for the air conditioner described herein, causes the air conditioning airflow to blow in a first direction when disposed at one end side in the direction orthogonal to the direction of flow of the flow path member, causes the air conditioning airflow to blow in a second direction when disposed at another end side in the direction orthogonal to the direction of flow of the flow path member, and divides the flow path in the flow path member in two in the direction orthogonal to the direction of flow when disposed at an intermediate position in the direction orthogonal to the direction of flow of the flow path member.

In an aspect of the air outlet structure for the air conditioner, when the movable flow path member is disposed at one end side in the direction orthogonal to the direction of flow of the flow path member, the air conditioning airflow is blown in the first direction, and when the movable member is disposed at the other end side in the direction orthogonal to the direction of flow of the flow path member, the air conditioning airflow is blown in the second direction. Further, when the movable flow path member is disposed at an intermediate position in the direction orthogonal to the direction of flow of the flow path member, the flow path in the flow path member is divided in two, in the direction orthogonal to the direction of flow, by this movable flow path member. At this time, the air conditioning airflow can be caused to blow out toward a wide range of front directions by the movable flow path member. Thus, a comparatively gentle air conditioning airflow can ventilate into the vehicle interior.

In another aspect of the air outlet structure for the air conditioner, the movable flow path member of the air outlet structure for the air conditioner described herein is provided with: a first wall portion that extends in a direction orthogonal to a direction of flow of the flow path member, receives the control force and is slid in the direction orthogonal to the direction of flow of the flow path member; a pair of second wall portions that are respectively turnably joined to a different one of two sliding direction end sides of the first wall portion; and a pair of third wall portions respectively having one end side turnably joined to a side of a different one of the pair of second wall portions that is opposite to respective joining portions with the first wall portion, with another end side of each of the pair of third wall portions being turnably joined to one another. Further, the movable flow path is configured to form a first state, in which a triangle is formed, respective sides of which are configured by the first wall portion together with the pair of second wall portions, and each of the pair of third wall portions, and a second state, in which a pentagon is formed by the first wall portion, each of the pair of second wall portions, and each of the pair of third wall portions. Moreover, the air outlet structure includes a switching unit that switches the movable flow path member between the first state and the second state in accordance with a sliding position of the first wall portion.

In an aspect of the air outlet structure for the air conditioner, the structure is provided with the first wall portion, the pair of second wall portions and the pair of third wall portions. This is a structure in which the first wall portion extends in the direction orthogonal to the direction of flow of the flow path member, receives a control force and is slid in the directional orthogonal to the direction of flow of the flow path member. The pair of second wall portions are respectively turnably joined to a different one of the two end sides in the sliding direction of the first wall portion. The pair of third wall portions respectively have one end side turnably joined to a end side of a different one of the pair of second wall portions that is opposite to respective joining portions with the first wall portion, with another end side of the pair of third wall portions being turnably joined to one another.

When the first wall portion of the movable flow path member receives a control force and is slid in the direction orthogonal to the direction of flow of the flow path member, the switching unit switches the whole movable flow path member between the first state, which is to say the state in which a triangle is formed with edges constituted by the first wall portion together with the pair of second wall portions, and each of the pair of third wall portions, and the second state, which is to say the state in which a pentagon is formed by each of the first wall portion, the pair of second wall portions and the pair of third wall portions. Thus, in an aspect of the air outlet structure for the air conditioner, the shape of the flow path itself within the flow path member is changed by the movable flow path member provided in the flow path member receiving a control force and switching between the triangular first state and the pentagonal second state.

In yet another aspect of the air outlet structure for the air conditioner, the movable flow path member of the air outlet structure for the air conditioner described herein causes the air conditioning airflow to blow in a first direction when the upstream side portion of the movable flow path member is disposed at one end side in the direction orthogonal to the direction of flow of the flow path member, causes the air conditioning airflow to blow in a second direction when the upstream side portion of the movable flow path member is disposed at another end side in the direction orthogonal to the direction of flow of the flow path member, and divides the flow path in the flow path member in two in the direction orthogonal to the direction of flow when the upstream side portion of the movable flow path member is disposed at an intermediate position in the direction orthogonal to the direction of flow of the flow path member.

In another aspect of the air outlet structure for the air conditioner, when the upstream side portion of the movable flow path member is disposed at the one end side in the direction orthogonal to the direction of flow of the flow path member, the air conditioning airflow is blown in the first direction, and when the upstream side portion of the movable flow path member is disposed at the other end side in the direction orthogonal to the direction of flow of the flow path member, the air conditioning airflow is blown in the second direction. Further, when the upstream side portion of the movable flow path member is disposed at an intermediate position in the direction orthogonal to the direction of flow of the flow path member, the flow path in the flow path member is divided in two, in the direction orthogonal to the direction of flow, by this movable flow path member. At this time, the air conditioning airflow can be caused to blow out toward a wide range of front directions by the movable flow path member. Thus, a comparatively gentle air conditioning airflow can ventilate into the vehicle interior.

In an aspect of the air outlet structure for the air conditioner, the movable flow path member of the air outlet structure for an air conditioner described herein is provided with: a first support shaft portion that extends in a direction orthogonal to both of the direction of flow of the flow path member and a displacement direction of the upstream side portion of the movable flow path member, and is displaceable in the displacement direction of the upstream side portion of the movable flow path member; a pair of second support shaft portions that are each disposed at an air outlet side relative to the first support shaft portion and extend in the direction of extension of the first support shaft portion, and are displaceable so as to move away from one another in the displacement direction of the upstream side portion of the movable flow path member; and an endless belt that is wound round and supported by the first support shaft portion and the pair of second support shaft portions. Further, the movable flow path member is configured to form a first state, in which the first support shaft portion is disposed at an intermediate position in the displacement direction of the upstream side portion of the movable flow path member and the pair of second support shaft portions are disposed at sides close to one another, and a second state, in which the first support shaft portion is disposed at an end side in the displacement direction of the upstream side portion of the movable flow path member and the pair of second support shaft portions are disposed at sides separated from one another. Moreover, the air outlet structure includes a switching unit that applies the control force to the movable flow path member and switches the movable flow path member between the first state and the second state.

In an aspect of the air outlet structure for the air conditioner, the movable flow path member is a structure provided with the first support shaft portion, the pair of second support shaft portions and the endless belt. The first support shaft portion is a structure which extends in a direction orthogonal to both of the direction of flow of the flow path member and the displacement direction of the upstream side portion of the movable flow path member, and is displaceable in the displacement direction of the upstream side portion of the movable flow path member. The pair of second support shaft portions are each a structure that is disposed at the air outlet side relative to the first support shaft portion and extends in the direction of extension of the first support shaft portion, and are displaceable so as to move away from one another in the displacement direction of the upstream side portion of the movable flow path member. The endless belt is wound round and supported by the first support shaft portion and the pair of second support shaft portions.

The switching unit applies a control force to the movable flow path member and switches the whole movable flow path member between the first state, which is to say the state in which the first support shaft portion is disposed at the intermediate position of the displacement direction of the upstream side portion of the movable flow path member and the pair of second shaft portions are disposed at sides close to one another, and the second state, which is to say the state in which the first support shaft portion is disposed at an end side of the displacement direction of the upstream side portion of the movable flow path member and the pair of second shaft portions are disposed at sides separated from one another. Thus, in an aspect of the air outlet structure for the air conditioner, the shape of the flow path itself within the flow path member is changed by the movable flow path member provided in the flow path member receiving a control force and switching between the first state and the second state.

Effects of the Invention

As detailed hereabove, according to the present invention, it is possible both to sufficiently assure volume and speed of an air conditioning airflow and to have excellent directivity, and also to give an air outlet into the interior of a vehicle a thin structure.

BEST MODE FOR CARRYING OUT THE INVENTION

First Exemplary Embodiment

Firstly, structure of an air outlet structure 10 for an air conditioner relating to the first exemplary embodiment of the present invention will be described.

In FIG. 1 to FIG. 9, the air outlet structure 10 for an air conditioner relating to the first exemplary embodiment of the present invention is shown. In FIG. 4 to FIG. 6 and FIG. 8, the movable flow path member 14 is, as appropriate, shown schematically. In each drawing, the arrow Fr, the arrow Up and the arrow Out represent forward in a front-rear direction of a vehicle, upward in a vertical direction of the vehicle and outward in a lateral direction of the vehicle, respectively.

The air outlet structure 10 for an air conditioner relating to the first exemplary embodiment of the present invention is integrally disposed at, for example, an instrument panel 70 mounted in the vehicle, and is provided with, as principal structures, a case 12 that serves as a flow path member and the movable flow path member 14.

Figure 1:
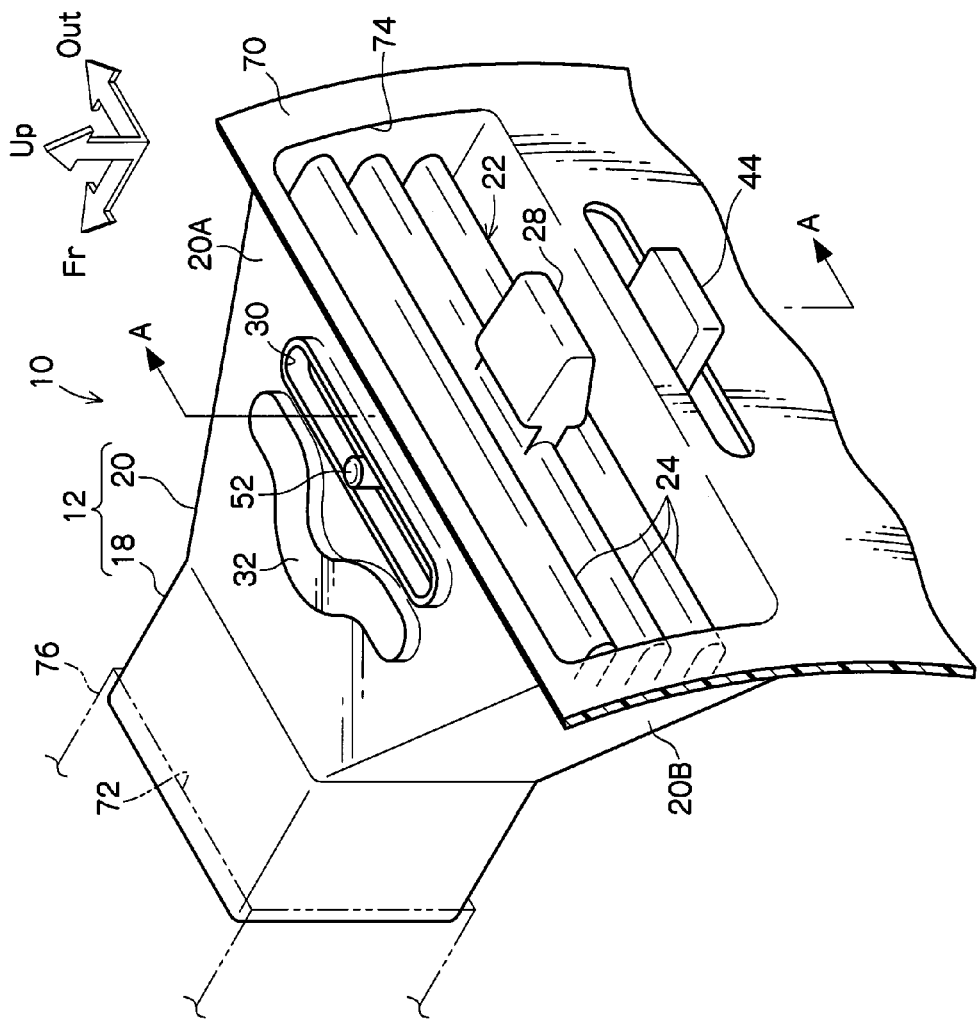
FIG. 1 is a perspective view of an air outlet structure for an air conditioner relating to a first exemplary embodiment of the present invention.
Figure 3:
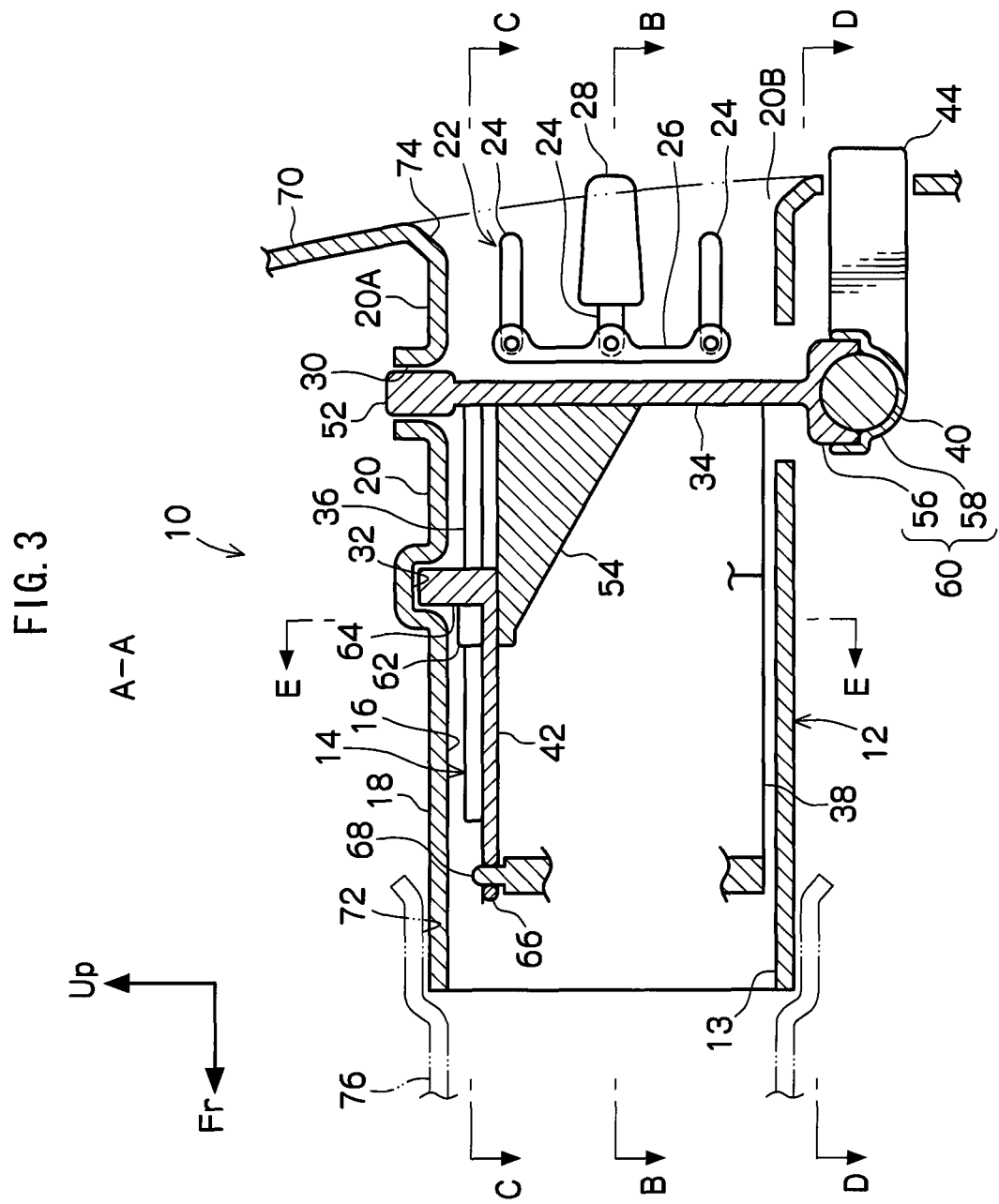
FIG. 3 is a sectional view in which the air outlet structure for an air conditioner relating to the first exemplary embodiment of the present invention is cut along line A-A of FIG. 1.

As shown in FIG. 3, the case 12 is for communicating an air outlet 72 of a duct 76, which is communicated with the air conditioner, with an air outlet 74 of the instrument panel 70, and is structured with a tubular body, including a cavity portion 16 that extends in the vehicle front-rear direction, thereinside. As shown in FIG. 1, the case 12 is provided with a first case portion 18, which is structured in a rectangular shape in cross section, and a second case portion 20, which communicates with the air outlet 74 side of this first case portion 18 and is structured in a rectangular shape in cross section, which widens in the vehicle lateral direction from the first case portion 18 toward the air outlet 74.

At the air outlet 74 side region of the second case portion 20, a vertical airflow direction-changing mechanism 22 is provided, for changing a direction of an air conditioning airflow blown out from the air outlet 74 in the vertical direction of the vehicle. As shown in FIG. 1 and FIG. 3, the vertical airflow direction-changing mechanism 22 is structured to include a plurality of fins 24, which extend in the vehicle lateral direction, and a joining member 26, to which the fins 24 are joined.

A vertical adjustment knob 28, which protrudes into the vehicle cabin, is provided at, of the plural fins 24, the fin 24 that is disposed centrally in the vehicle vertical direction. The fins 24 are turnably supported at a side wall portion 20B of the second case portion 20. Thus, this vertical airflow direction-changing mechanism 22 is a structure in which the three fins 24 joined by the joining member 26 are angled in the vertical direction by the vertical adjustment knob 28 being operated up or down, and changes the direction of the air conditioning airflow being blown out from the air outlet 74 in the vehicle vertical direction.

A first guide groove 30 and a second guide groove 32 are formed in an upper wall portion 20A of the second case portion 20. The first guide groove 30 is movably engaged with a first guide pin 52 formed at the movable flow path member 14, which will be described below, is formed to penetrate through the upper wall portion 20A of the second case portion 20 in the thickness direction thereof, and is formed so as to extend along a direction (in this case, the vehicle lateral direction) orthogonal to the direction of extension of the cavity portion 16 in the case 12 (that is, a direction of flow of the case 12).

The second guide groove 32, meanwhile, is movably engaged with a second guide pin 64 formed at the movable flow path member 14, which will be described later, and is formed in a recessed shape so as to be recessed from the cavity portion 16 into the upper wall portion 20A of the second case portion 20 (and thus protrudes in a protrusion shape at an upper face side of the upper wall portion 20A). The second guide groove 32 is formed in a substantial "⌒" shape in plan view, so as to approach the air outlet 74 side from the middle toward respective end sides of the direction (in this case, the vehicle lateral direction) that is orthogonal to the direction of extension of the cavity portion 16 in the case 12 (that is, the direction of flow of the case 12) (in other words, from the vehicle lateral direction middle side toward respective outer sides of the upper wall portion 20A of the second case portion 20) (see FIG. 1).

Figure 2:
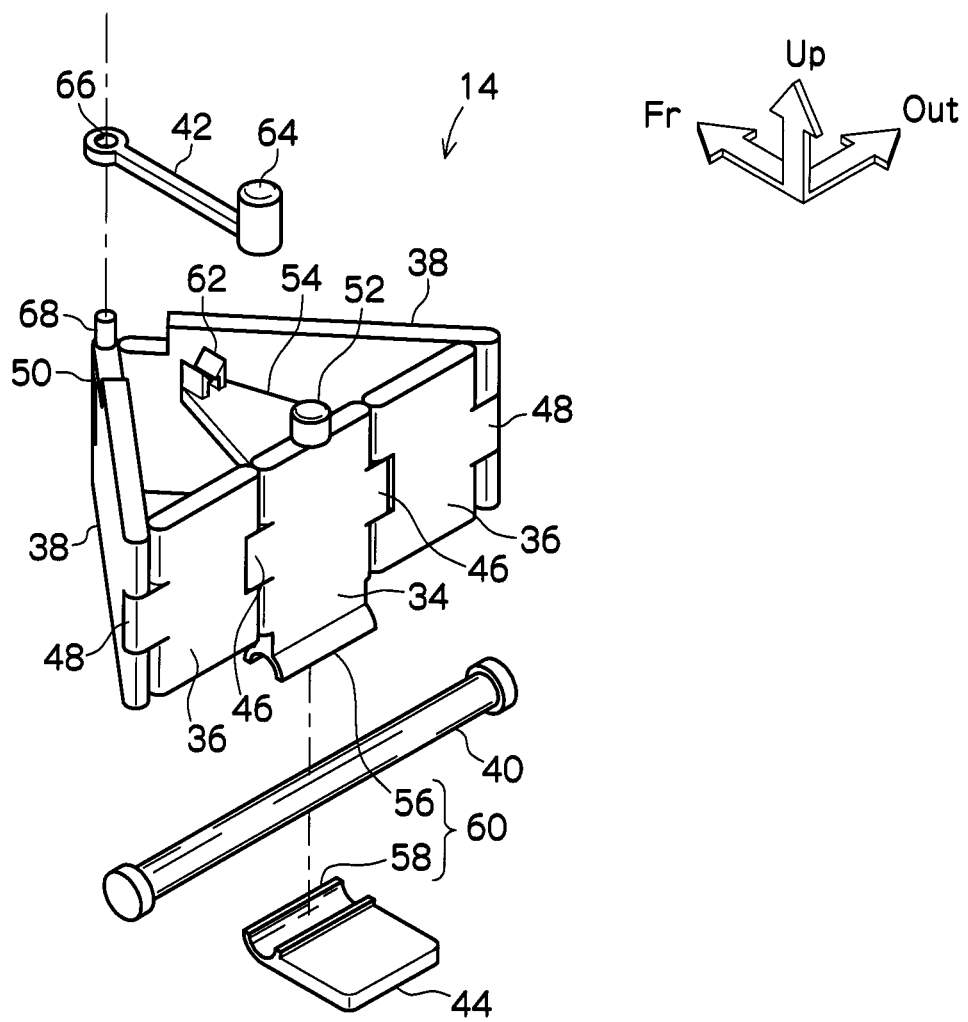
FIG. 2 is an exploded perspective view of a movable flow path member provided in the air outlet structure for an air conditioner relating to the first exemplary embodiment of the present invention.

As shown in FIG. 3, the movable flow path member 14 is disposed in the cavity portion 16 in the case 12, and fulfills a function of changing the direction of the air conditioning airflow blown out from the air outlet 74 in the vehicle left-right direction. As shown in FIG. 2, the movable flow path member 14 is structured to include a first wall portion 34, a pair of second wall portions 36, a pair of third wall portions 38, a first rod 40, a second rod 42 and a left-right adjustment knob 44.

Figure 4:
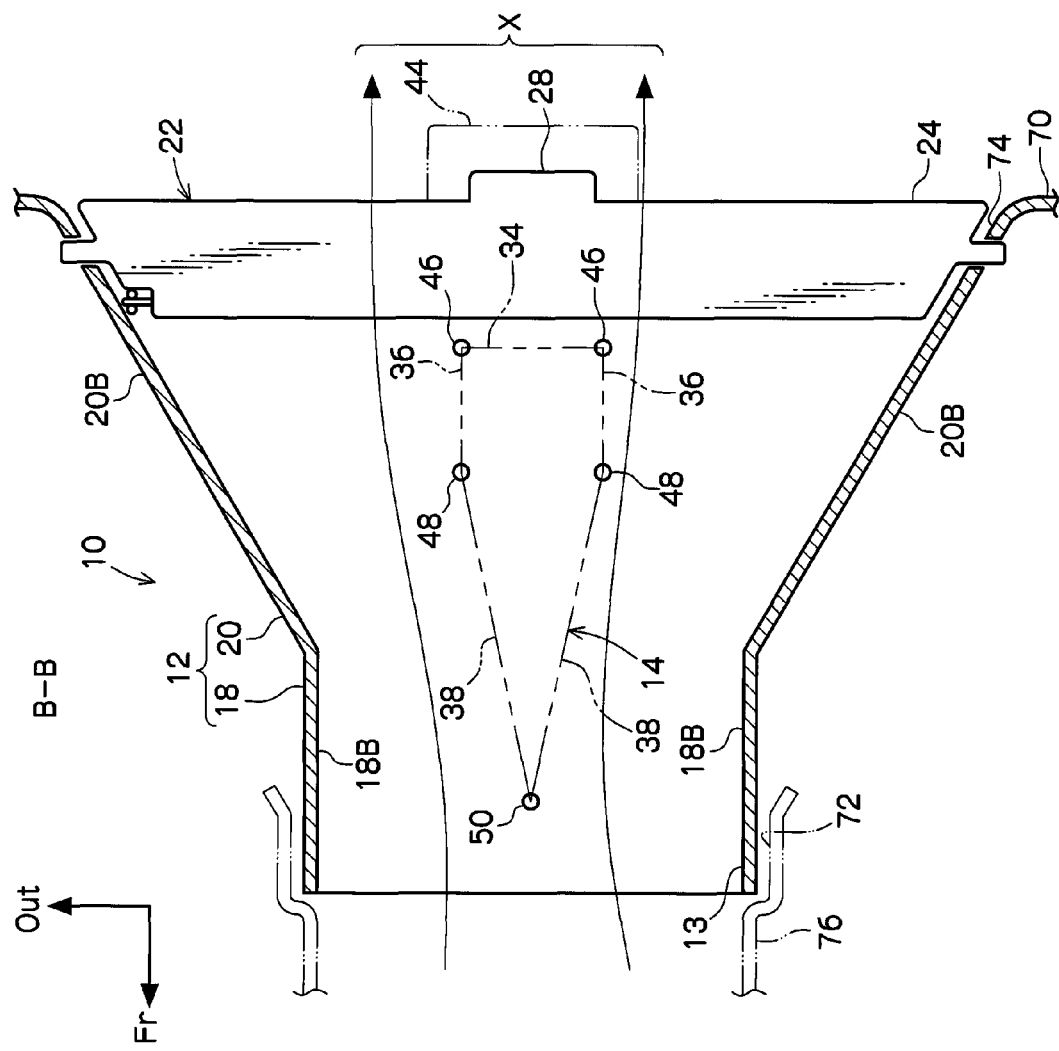
FIG. 4 is a sectional view in which the air outlet structure for an air conditioner relating to the first exemplary embodiment of the present invention is cut along line B-B of FIG. 3.
Figure 5:
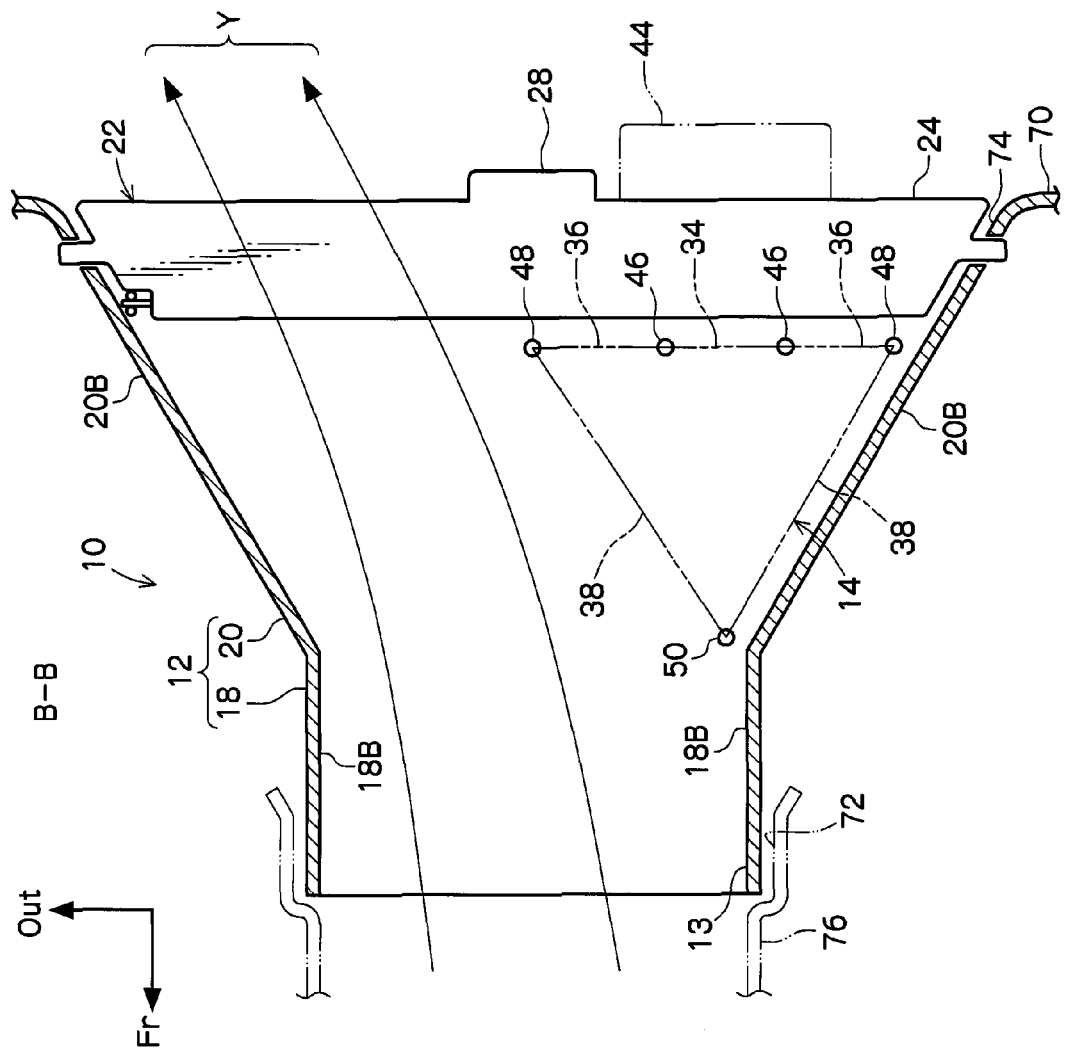
FIG. 5 is an operation description view of the air outlet structure for an air conditioner relating to the first exemplary embodiment of the present invention.
Figure 6:
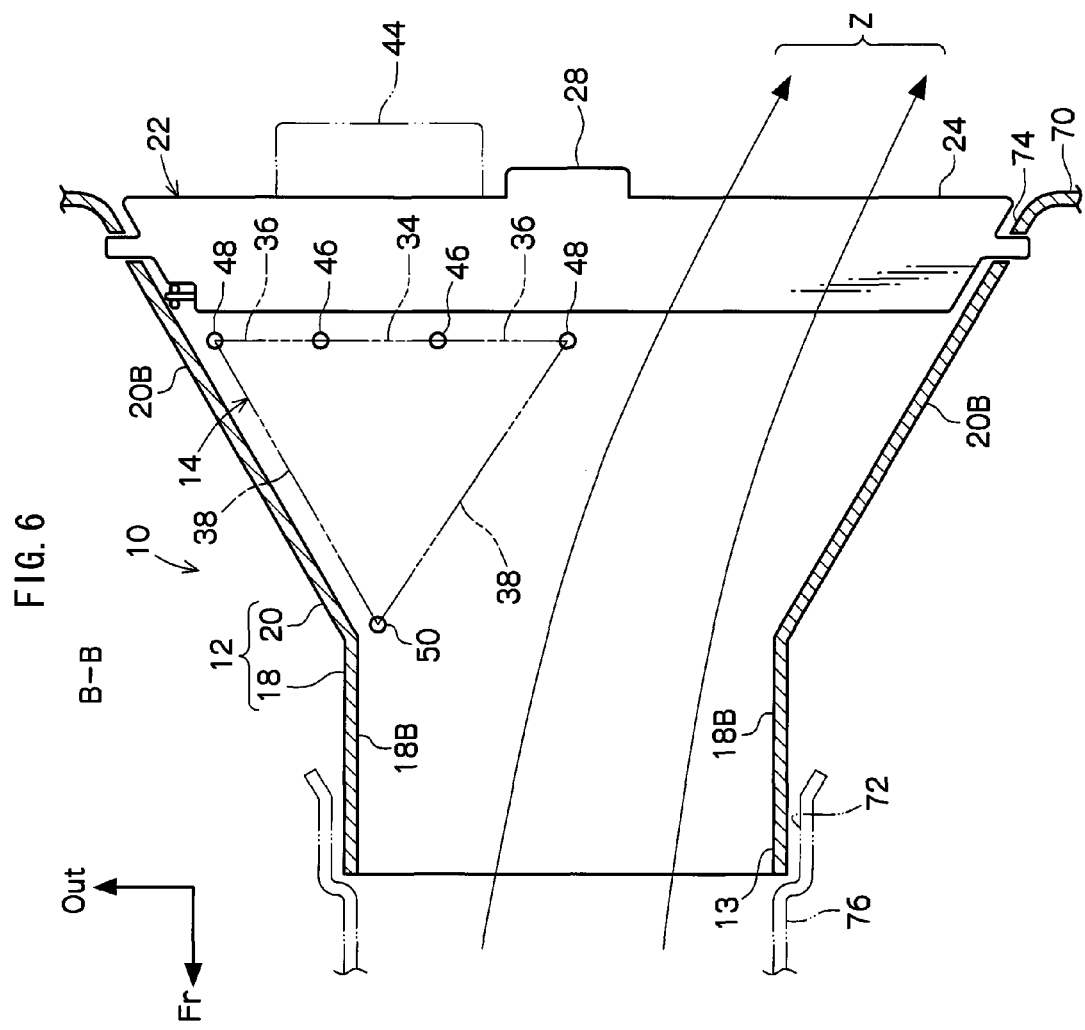
FIG. 6 is an operation description view of the air outlet structure for an air conditioner relating to the first exemplary embodiment of the present invention.

The second wall portions 36 are respectively turnably joined, via joining portions 46, to two end sides of the first wall portion 34. The third wall portions 38 are respectively turnably joined, via joining portions 48, to the second wall portions 36 at opposite sides thereof from the joining portions 46 with the first wall portion 34. The third wall portions 38 are also turnably joined to one another by a joining portion 50 at opposite sides thereof from the joining portions 48 with the second wall portions 36. The respective joining portions 46, 48 and 50 serve as turning axes, in the vehicle vertical direction, of the wall portions. Thus, as shown in FIG. 4 to FIG. 6, the movable flow path member 14 structured by this plurality of wall portions is disposed such that the first wall portion 34 extends in the direction (in this case, the vehicle lateral direction) orthogonal to the direction of flow of the case 12 and such that the joining portion 50 between the third wall portions 38 is disposed at an air inlet 13 side of the case 12.

As shown in FIG. 2, the first wall portion 34 of this movable flow path member 14 is structured to include the first guide pin 52, a stay 54 and a connection portion 56. The first guide pin 52 protrudes upward from an upper end portion of the first wall portion 34. The stay 54 is provided at this upper end portion and protrudes from the upper end portion toward the joining portion 50 between the third wall portions 38. The connection portion 56 is provided at a lower portion of the first wall portion 34 and is integrally connected with a connected portion 58 of the left-right adjustment knob 44. As shown in FIG. 1 and FIG. 3, the first guide pin 52 is movably engaged with the first guide groove 30 formed in the upper wall portion 20A of the second case portion 20. The connection portion 56, with the connected portion 58 provided at the left-right adjustment knob 44, constitutes a fixing portion 60. This fixing portion 60 is fixed to the first rod 40 to be movable in a length direction thereof. Here, the first rod 40 extends in the direction (in this case, the vehicle lateral direction) orthogonal to the direction of flow of the case 12.

Thus, with this structure, the whole movable flow path member 14 is made movable in the direction (in this case, the vehicle lateral direction) orthogonal to the direction of flow of the case 12, by the first guide pin 52 being guided in the first guide groove 30 and the fixing portion 60 being guided on the first rod 40.

As shown in FIG. 2, a support portion 62, which supports the second rod 42 to be movable along the direction of flow of the case 12, is provided at the stay 54 that is provided at the first wall portion 34 of the movable flow path member 14. The second rod 42 is supported to be movable in the length direction thereof by the above-mentioned support portion 62, and is structured to include the second guide pin 64 and a joining hole portion 66, respectively, at the two end sides thereof. As shown in FIG. 3, the second guide pin 64 is movably engaged with the second guide groove 32 in the upper wall portion 20A of the second case portion 20, and a joining pin 68, which protrudes from the region of joining together of the third wall portions 38, is inserted into the joining hole portion 66. Thus, because the joining pin 68 protruding at the third wall portions 38 is inserted into the joining hole portion 66 of the second rod 42 in this manner, the third wall portions 38 are made turnable with respect to the second rod 42.

Figure 7:
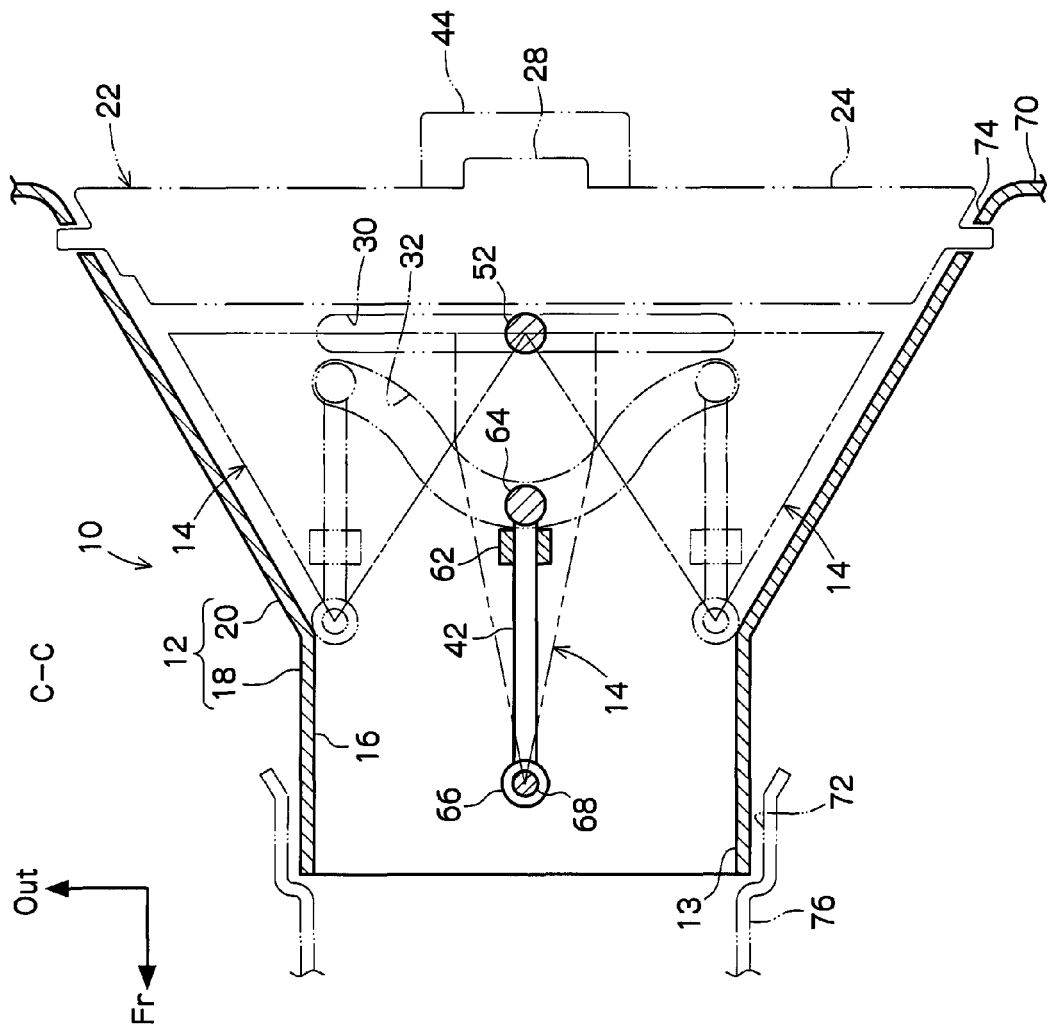
FIG. 7 is a sectional view in which the air outlet structure for an air conditioner relating to the first exemplary embodiment of the present invention is cut along line C-C of FIG. 3.
Figure 8:
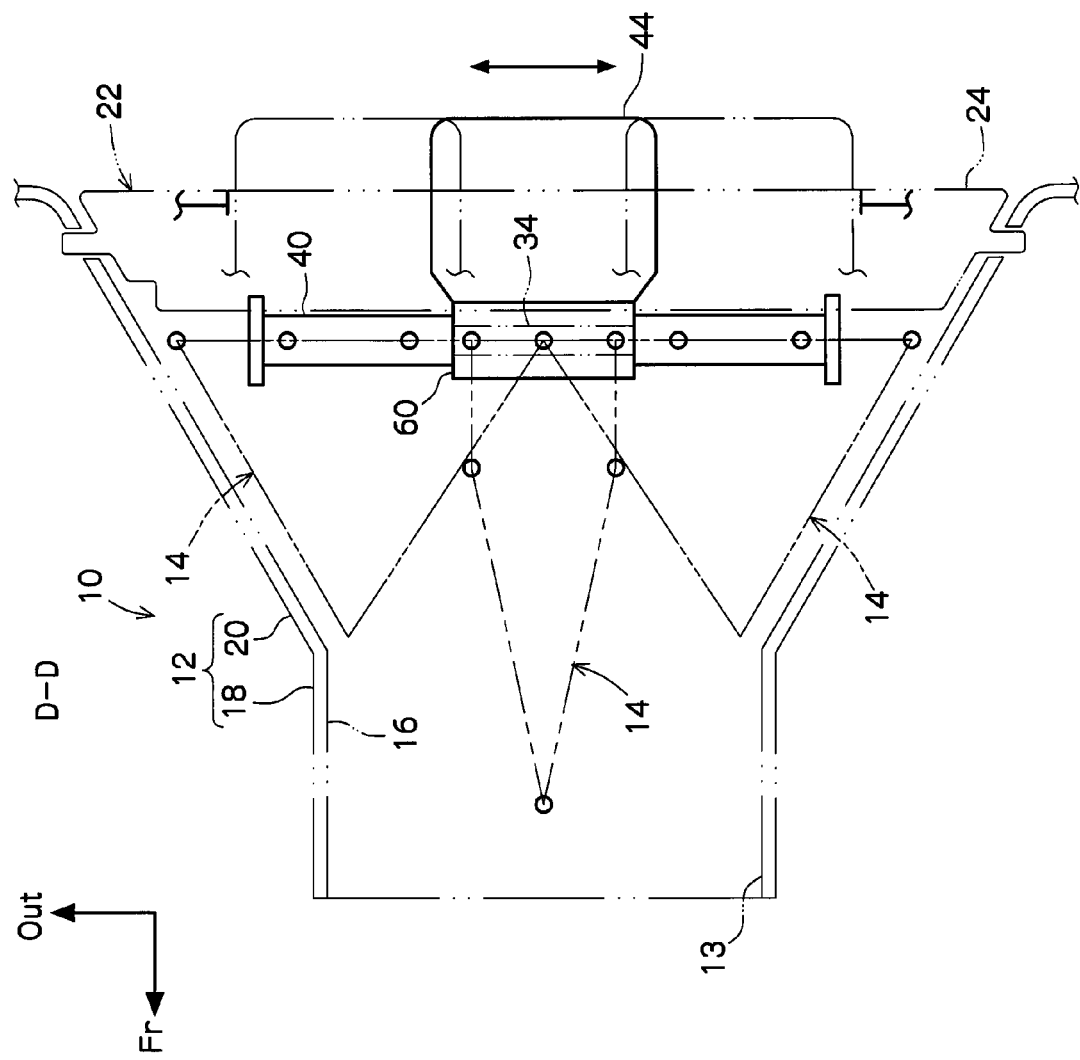
FIG. 8 is a sectional view in which the air outlet structure for an air conditioner relating to the first exemplary embodiment of the present invention is cut along line D-D of FIG. 3.
Figure 9:
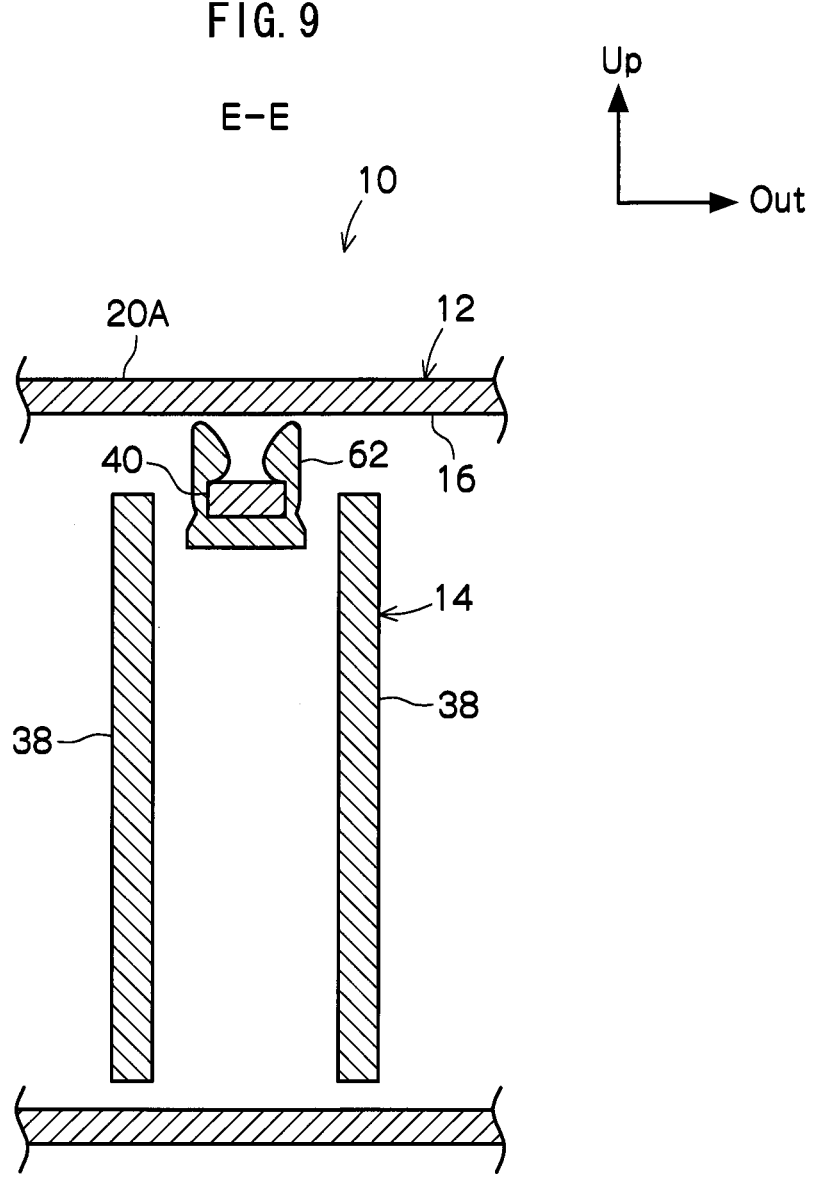
FIG. 9 is a sectional view in which the air outlet structure for an air conditioner relating to the first exemplary embodiment of the present invention is cut along line E-E of FIG. 3.

With this structure, the whole movable flow path member 14 is a structure whose shape changes as follows in accordance with movement in the direction (in this case, the vehicle lateral direction) orthogonal to the direction of flow of the case 12. That is, as is shown in FIG. 8, when the left-right adjustment knob 44 is operated to left or right, the whole movable flow path member 14 accordingly moves in the direction (in this case, the vehicle lateral direction) orthogonal to the direction of flow of the case 12. At this time, as shown in FIG. 7, because the second guide pin 64 is guided by the second guide groove 32, the second rod 42 moves in the direction of flow of the case 12.

Here, when the left-right adjustment knob 44 is disposed at a position at a left-right end side, the second guide pin 64 is guided to one end side of the second guide groove 32, and the second rod 42 is moved toward the air outlet 74. Thus, at this time, the joining hole portion 66 of the second rod 42 causes the joining pin 68 protruding from the region of joining together of the third wall portions 38 to move toward the air outlet 74. As a result, the third wall portions 38 are wholly moved toward the air outlet 74. In accordance therewith, the second wall portions 36 are turned relative to the first wall portion 34 and become parallel with the direction orthogonal to the direction of flow of the case 12, and the whole movable flow path member 14 forms a triangular shape at a sliding direction end side position (the first state relating to the present invention). At this time, as is shown in FIG. 5 and FIG. 6, the movable flow path member 14 approaches the vehicle left-right direction end side and the third wall portions 38 are in an angled state relative to a wall side portion 18B of the first case portion 18, the shape of the flow path itself within the case 12 is changed, and the direction of the air conditioning airflow being blown out from the air outlet 74 in the vehicle left-right direction is changed. At this time, a joining wall surface is structured in which the third wall portion 38 does not have a step difference from the wall side portion 18B of the first case portion 18.

On the other hand, when the left-right adjustment knob 44 is disposed at an intermediate position, the second guide pin 64 is guided to the middle of the second guide groove 32, and the second rod 42 is moved toward the air inlet 13. Thus, at this time, the joining hole portion 66 of the second rod 42 causes the joining pin 68 protruding from the region of joining together of the third wall portions 38 to move toward the air inlet 13. As a result, the third wall portions 38 are wholly moved toward the air inlet 13. In accordance therewith, the second wall portions 36 are turned relative to the first wall portion 34 and become parallel with the direction of flow of the case 12, and the whole movable flow path member 14 forms a pentagonal shape at a sliding direction central position (the second state relating to the present invention). At this time, as is shown in FIG. 4, as the third wall portions 38 move away from the air outlet 74 and toward the air inlet 13, a tapered shape is formed and the second wall portions 36 become parallel with the direction of flow of the case 12 in front of the air outlet 74. Thus, the whole movable flow path member 14 is in a state which is thin in the direction orthogonal to the direction of flow of the case 12. Moreover, at this time, the whole movable flow path member 14 divides the flow path in the case 12 in two in the direction orthogonal to the direction of flow of the case 12.

Next, operation of the air outlet structure 10 for an air conditioner relating to the first exemplary embodiment of the present invention will be described.

In the air outlet structure 10 for an air conditioner relating to the first exemplary embodiment of the present invention, when an air conditioning airflow is being blown out from an unillustrated air outlet of the air conditioner, the air conditioning airflow passes through the case 12 and is blown out through the air outlet 74. At this time, if the left-right adjustment knob 44 is disposed at the central position, as described above, the whole movable flow path member 14 forms a pentagonal shape at the sliding direction central position. At this time, as shown in FIG. 4, the second wall portions 36 are parallel with the direction of flow of the case 12 in front of the air outlet 74. Therefore, an air conditioning airflow X toward the front face of the instrument panel 70 is blown out from the air outlet 74.

Further, at this time, because the third wall portions 38 are in a form that tapers away from the air outlet 74 toward the air inlet 13 and the second wall portions 36 are parallel with the direction of flow of the case 12 in front of the air outlet 74, the whole movable flow path member 14 is in a state which is thin in the direction orthogonal to the direction of flow of the case 12. Therefore, an effective cross-sectional area in the case 12 is ensured, and an air conditioning airflow with sufficient volume and speed from the air outlet 74 is obtained.

Moreover, at this time, the whole movable flow path member 14 divides the flow path in the case 12 in two in the direction orthogonal to the direction of flow. Therefore, the air conditioning airflow can be caused to blow out toward a wide range of front directions by the movable flow path member 14. Thus, a comparatively gentle air conditioning airflow can ventilate into the vehicle interior.

On the other hand, when the left-right adjustment knob 44 is disposed at a position at the left end side, as described earlier, the whole movable flow path member 14 forms a triangular shape at the sliding direction left end side position. At this time, as is shown in FIG. 5, the third wall portions 38 are in an angled state relative to the wall side portion 18B of the first case portion 18, the shape of the flow path itself within the case 12 is changed, and the direction of the air conditioning airflow blown out from the air outlet 74 is changed to the vehicle rightward direction. Therefore, an air conditioning airflow Y with a high directivity to the vehicle rightward direction is blown out from the air outlet 74.

Further, at this time, the movable flow path member 14 approaches the vehicle left side and structures a joining wall surface in which the third wall portion 38 does not have a step difference from the wall side portion 18B of the first case portion 18. Therefore, an effective cross-sectional area in the case 12 is ensured, and an air conditioning airflow with sufficient volume and speed from the air outlet 74 is obtained.

Similarly, when the left-right adjustment knob 44 is disposed at a position at the right end side, as described above, the whole movable flow path member 14 forms a triangular shape at the sliding direction right end side position. At this time, as is shown in FIG. 6, the third wall portions 38 are in an angled state relative to the wall side portion 18B of the first case portion 18, the shape of the flow path itself within the case 12 is changed, and the direction of the air conditioning airflow blown out from the air outlet 74 is changed to the vehicle leftward direction. Therefore, an air conditioning airflow Z with a high directivity to the vehicle leftward direction is blown out from the air outlet 74.

Further, at this time, the movable flow path member 14 approaches the vehicle left side and structures a joining wall surface in which the third wall portion 38 does not have a step difference from the wall side portion 18B of the first case portion 18. Therefore, an effective cross-sectional area in the case 12 is ensured, and an air conditioning airflow with sufficient volume and speed from the air outlet 74 is obtained.

Figure 21:
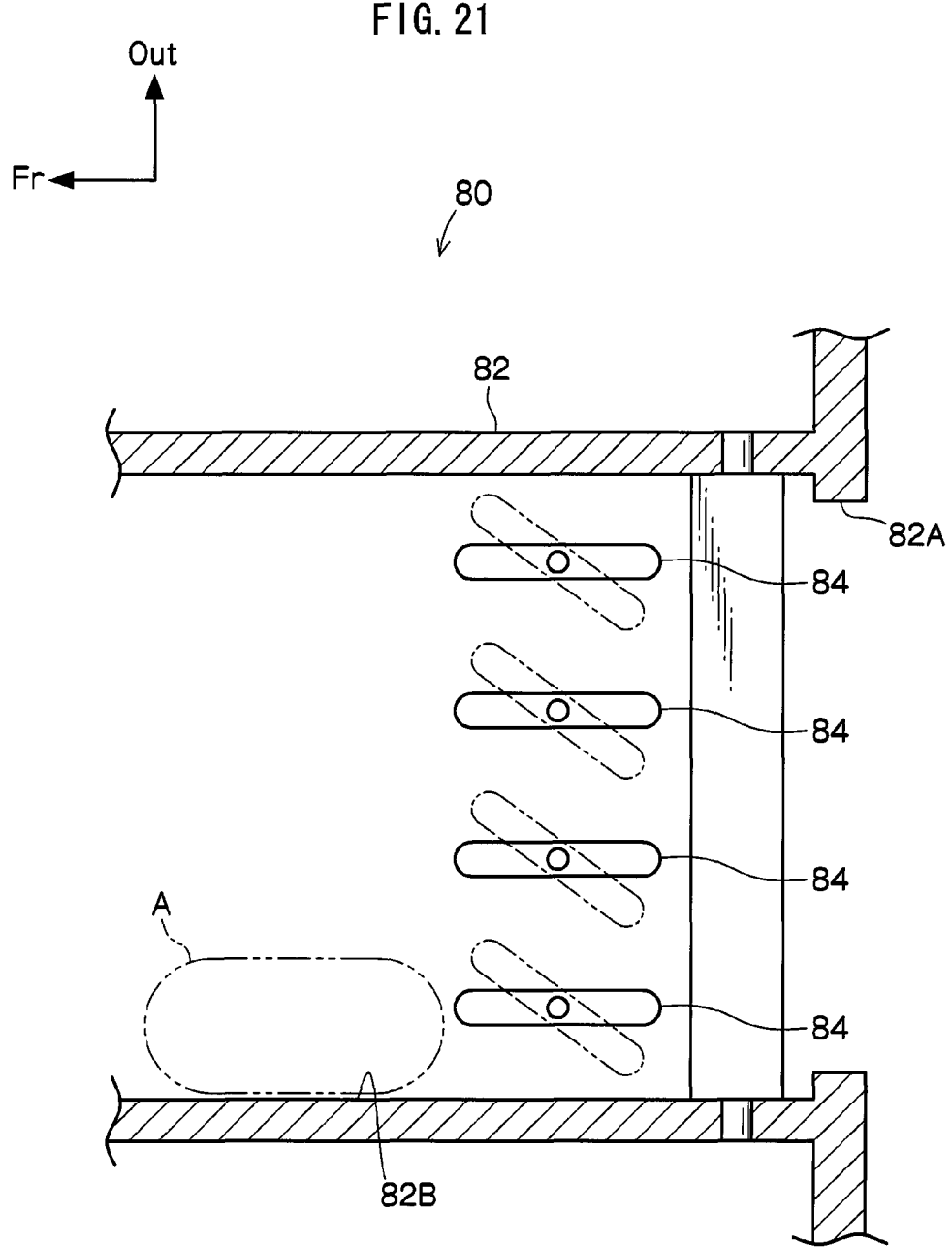
FIG. 21 is a sectional view of an air outlet structure for an air conditioner relating to a comparative example.

Now, operation of the air outlet structure 10 for an air conditioner relating to the first exemplary embodiment of the present invention will be further clarified while being compared with a comparative example. FIG. 21 shows a sectional view showing an air outlet structure 80 for an air conditioner relating to the comparative example. In the air outlet structure 80 for an air conditioner relating to the comparative example shown in FIG. 21, fins 84 for changing the left-right blowing direction are plurally provided in a flow path in a case 82.

When the fins 84 for changing the left-right blowing direction are plurally provided in the case 82, as in the air outlet structure 80 for an air conditioner relating to this comparative example, the plural fins 84 are disposed in the flow path. Therefore, an actual outlet area of an air outlet 82A is reduced by these fins 84. Moreover, when the fins 84 are maximally angled to change the direction of the air conditioning airflow, as shown by the imaginary lines, a region A is formed in which the air conditioning airflow in the flow path is held back by the fin 84, of the plural fins 84, that is disposed close to a flow path wall surface 82B, and the actual outlet area of the air outlet 82A is reduced. Accordingly, because the actual outlet area of the air outlet 82A is reduced, a volume and speed of the air conditioning airflow are insufficient. To have sufficient volume and speed of the air conditioning airflow, it is necessary to enlarge the air outlet 82A. However, if the air outlet 82A is enlarged, it is difficult to form the air outlet 82A into a structure that is thin in a vertical direction and a left-right direction of the vehicle.

In contrast, according to the air outlet structure 10 for an air conditioner relating to the first exemplary embodiment of the present invention, as described above, the movable flow path member 14 provided in the case 12 deforms in accordance with operation of the left-right adjustment knob 44, and the shape of the flow path itself within the case 12 changes. Thus, there is no need to provide a plurality fins for changing the left-right blowing direction (corresponding to the fins 84 of the comparative example) in the flow path in the case 12. Therefore, the effective cross-sectional area of the flow path in the case 12 can be ensured, and the volume and speed of the air conditioning airflow can be sufficiently ensured.

Further, because the direction of the air conditioning airflow from the air outlet 74 can be controlled by changing the shape of the flow path itself within the case 12, an air conditioning airflow with excellent directivity can be obtained. Moreover, because the effective cross-sectional area of the flow path in the case 12 can be ensured as mentioned above, the air outlet 74 into the vehicle interior can be formed with a structure thinner in the vehicle vertical direction or the vehicle left-right direction than the structure of the comparative example. Therefore, a degree of freedom of design of the instrument panel 70 can be improved.

Further, in the air outlet structure 10 for an air conditioner relating to the first exemplary embodiment of the present invention, as described above, the movable flow path member 14 deforms while sliding in the direction (in this case, the vehicle lateral direction) orthogonal to the direction of flow of the case 12 in accordance with operation of the left-right adjustment knob 44, and thus the shape of the flow path in the case 12 is changed. Therefore, the shape of the flow path in the case 12 can be considerably changed as described above and, accordingly, the direction of the air conditioning airflow can be considerably switched.

Further, in the air outlet structure 10 for an air conditioner relating to the first exemplary embodiment of the present invention, when the left-right adjustment knob 44 is disposed at the central position and the whole movable flow path member 14 is formed into a pentagon at the sliding direction central position, the air conditioning airflow can be caused to blow out toward a wide range of front directions by the movable flow path member 14. Thus, a comparatively gentle air conditioning airflow can ventilate into the vehicle interior.

Further, in the air outlet structure 10 for an air conditioner relating to the first exemplary embodiment of the present invention, as described above, there is no need to provide a plurality fins for changing the left-right blowing direction in the flow path in the case 12. Therefore, the generation of noise by fins in the case 12 interfering with the air conditioning airflow can be prevented.

Next, variant examples of the air outlet structure 10 for an air conditioner relating to the first exemplary embodiment of the present invention will be described.

In the exemplary embodiment described above, the air outlet structure 10 for an air conditioner is used for changing the direction of an air conditioning airflow in the vehicle left-right direction. However, the air outlet structure 10 for an air conditioner may be used for changing the direction of an air conditioning airflow in the vehicle vertical direction.

Further, in the exemplary embodiment described above, the movable flow path member 14 is structured so as to be deformed and slid in accordance with operation by manual operation of the left-right adjustment knob 44. However, the movable flow path member 14 may be structured so as to be deformed and slid by electrical operation by a driving apparatus or the like.

Second Exemplary Embodiment

Next, structure of an air outlet structure 110 for an air conditioner relating to a second exemplary embodiment of the present invention will be described.

In FIG. 10 to FIG. 20, the air outlet structure 110 for an air conditioner relating to the second exemplary embodiment of the present invention is shown. In each drawing, the arrow Fr, the arrow Up and the arrow Out represent forward in the front-rear direction of a vehicle, upward in the vertical direction of the vehicle and outward in the lateral direction of the vehicle, respectively.

The air outlet structure 110 for an air conditioner relating to the second exemplary embodiment of the present invention is integrally disposed at, for example, an instrument panel mounted in the vehicle, and is provided with, as principal structures, a case 112 which serves as a flow path member, a switching mechanism 113 which serves as switching unit, and a movable flow path member 114.

Figure 11:
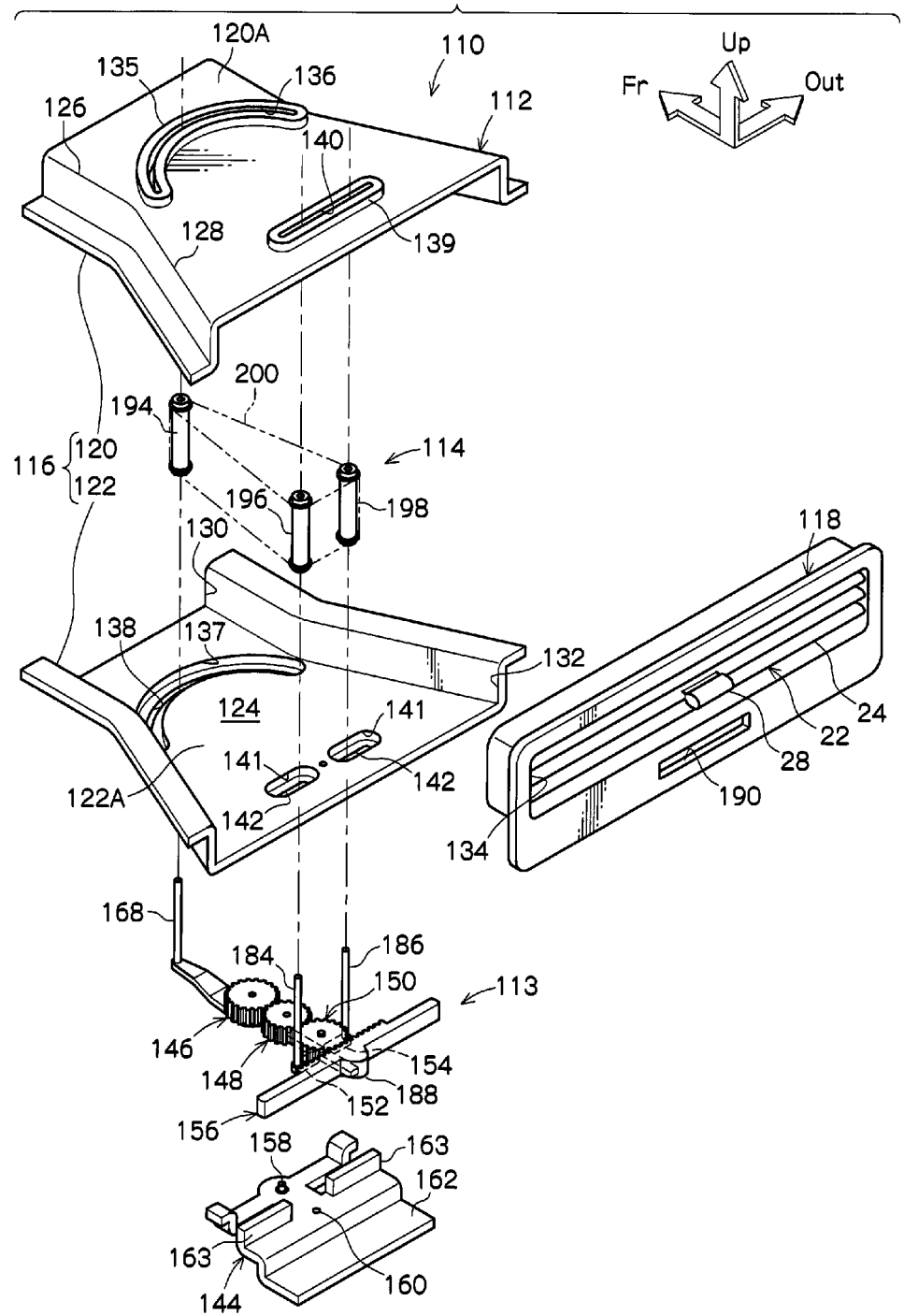
FIG. 11 is an exploded perspective view of the air outlet structure for an air conditioner relating to the second exemplary embodiment of the present invention.

As shown in FIG. 11, the case 112 is structured to include a tubular case 116 and an air outlet panel 118. The tubular case 116 is structured by an upper case 120 and a lower case 122, and includes thereinside a cavity portion 124 which extends in the vehicle front-rear direction. This tubular case 116 is provided with a first case portion 126, which is structured in a rectangular shape in cross section, and a second case portion 128, which is formed to communicate with the air outlet panel 118 side of this first case portion 126 and is structured in a rectangular shape in cross section, which widens in the vehicle lateral direction from the first case portion 126 toward the air outlet panel 118.

Figure 10:
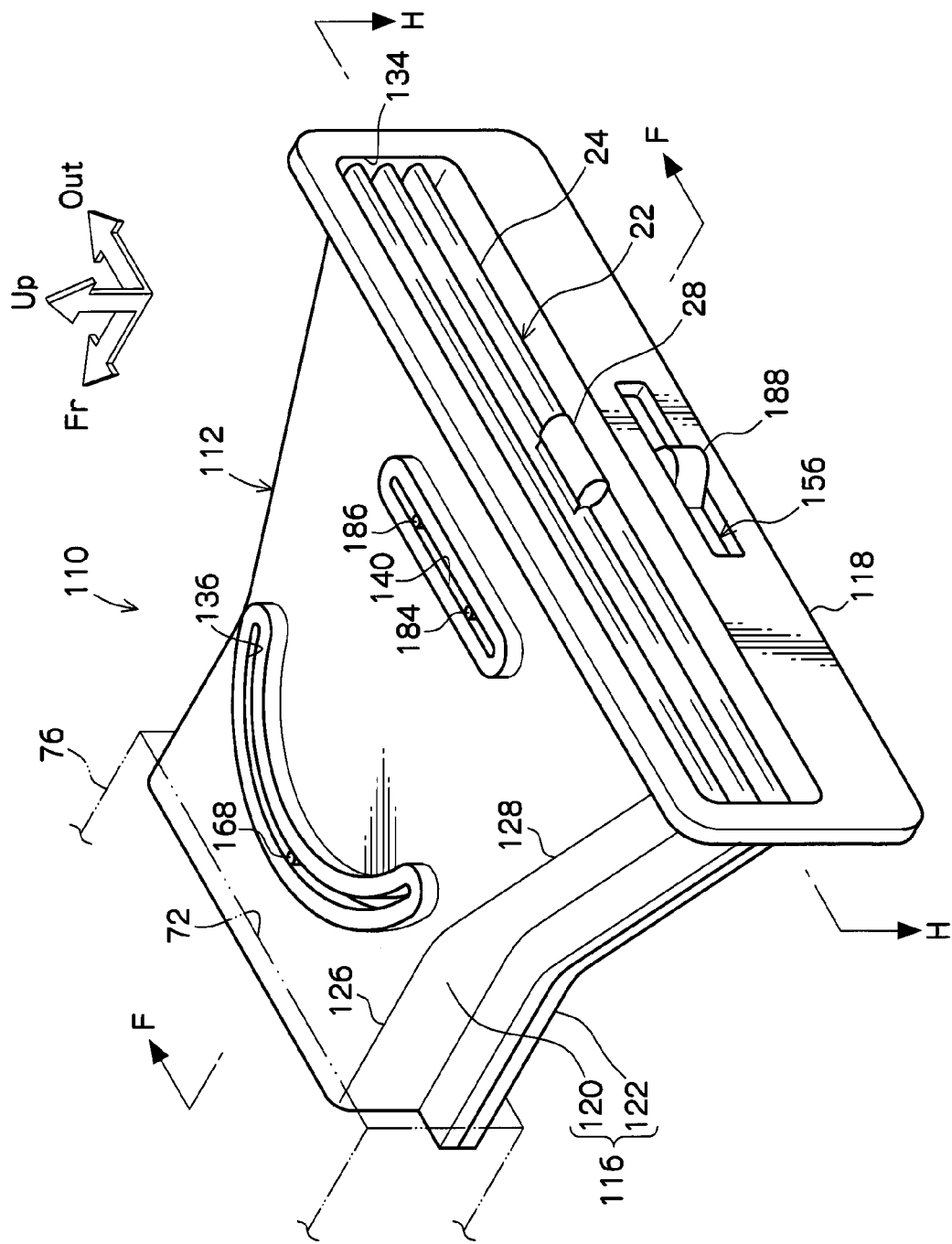
FIG. 10 is a perspective view of an air outlet structure for an air conditioner relating to a second exemplary embodiment of the present invention.

Opening portions 130 and 132 are formed in the tubular case 116, at the front side and rear side, respectively, of the vehicle front-rear direction. Further, as shown in FIG. 10, the air outlet 72 of the duct 76, which is communicated with the air conditioner, is communicated with the opening portion 130, and the air outlet panel 118 is fixed at the opening portion 132 formed at the vehicle front-rear direction rear side.

An air outlet 134 is opened at the air outlet panel 118, and the vertical airflow direction-changing mechanism 22 is provided at the air outlet 134 for changing a direction of an air conditioning airflow into the vehicle interior in the vehicle vertical direction. This vertical airflow direction-changing mechanism 22 is the same as the structure relating to the above-described first exemplary embodiment.

As shown in FIG. 11, first groove portions 135 and 137 and second groove portions 139 and 141 are formed in the upper case 120 and the lower case 122, respectively, of the tubular case 116. The first groove portion 135 and the second groove portion 139 are recessed toward the vehicle vertical direction upper side from a horizontal wall portion 120A of the upper case 120, and the first groove portion 137 and the second groove portion 141 are recessed toward the vehicle vertical direction lower side from a horizontal wall portion 122A of the lower case 122.

The first groove portions 135 and 137 are each formed in a circular arc shape extending along the direction (in this case, the vehicle lateral direction) orthogonal to the direction of extension of the cavity portion 124 in the tubular case 116 (that is, the direction of flow of the case 112). Meanwhile, the second groove portions 137 and 141 are each formed in a linear shape extending along the direction (in this case, the vehicle lateral direction) orthogonal to the direction of extension of the cavity portion 124 in the tubular case 116 (that is, the direction of flow of the case 112). Herein, the second groove portion 141 formed in the lower case 122 is formed to be divided into two sides sandwiching a vehicle lateral direction central portion.

First guide grooves 136 and 138 are formed in the first groove portions 135 and 137, respectively, along groove length directions thereof. The first guide grooves 136 and 138 are formed to penetrate through the horizontal wall portions 120A and 122A of the upper case 120 and the lower case 122, respectively, in the plate thickness direction. Meanwhile, second guide grooves 140 and 142 are formed in the second groove portions 139 and 141, respectively, along the groove length directions thereof. The second guide grooves 140 and 142 are formed to penetrate through the horizontal wall portions 120A and horizontal wall portion 122A of the upper case 120 and the lower case 122, respectively, in the plate thickness direction.

The switching mechanism 113 is provided at the vehicle vertical direction lower side of the tubular case 116. The switching mechanism 113 is for switching the state of the movable flow path member 114, which will be described later, and is structured to include a support plate 144, a first gear 146, a second gear 148, a third gear 150, a pair of arms 152 and 154, and a left-right adjustment knob 156.

The support plate 144 is integrally fixed to the vehicle vertical direction lower side face of the horizontal wall portion 122A of the lower case 122 provided at the tubular case 116. A support protrusion 158 is provided at the vehicle front-rear direction forward side of the support plate 144. A support hole portion 160 is also provided at the support plate 144, at the vehicle front-rear direction rearward side of the support protrusion 158. A sliding support portion 162, which extends in the vehicle lateral direction, is provided at the vehicle front-rear direction rearward side of the support hole portion 160. A pair of sliding guide wall portions 163, which extend in the vehicle lateral direction at both sides in the vehicle lateral direction of the support hole portion 160, are also provided at the support plate 144.

Figure 12:
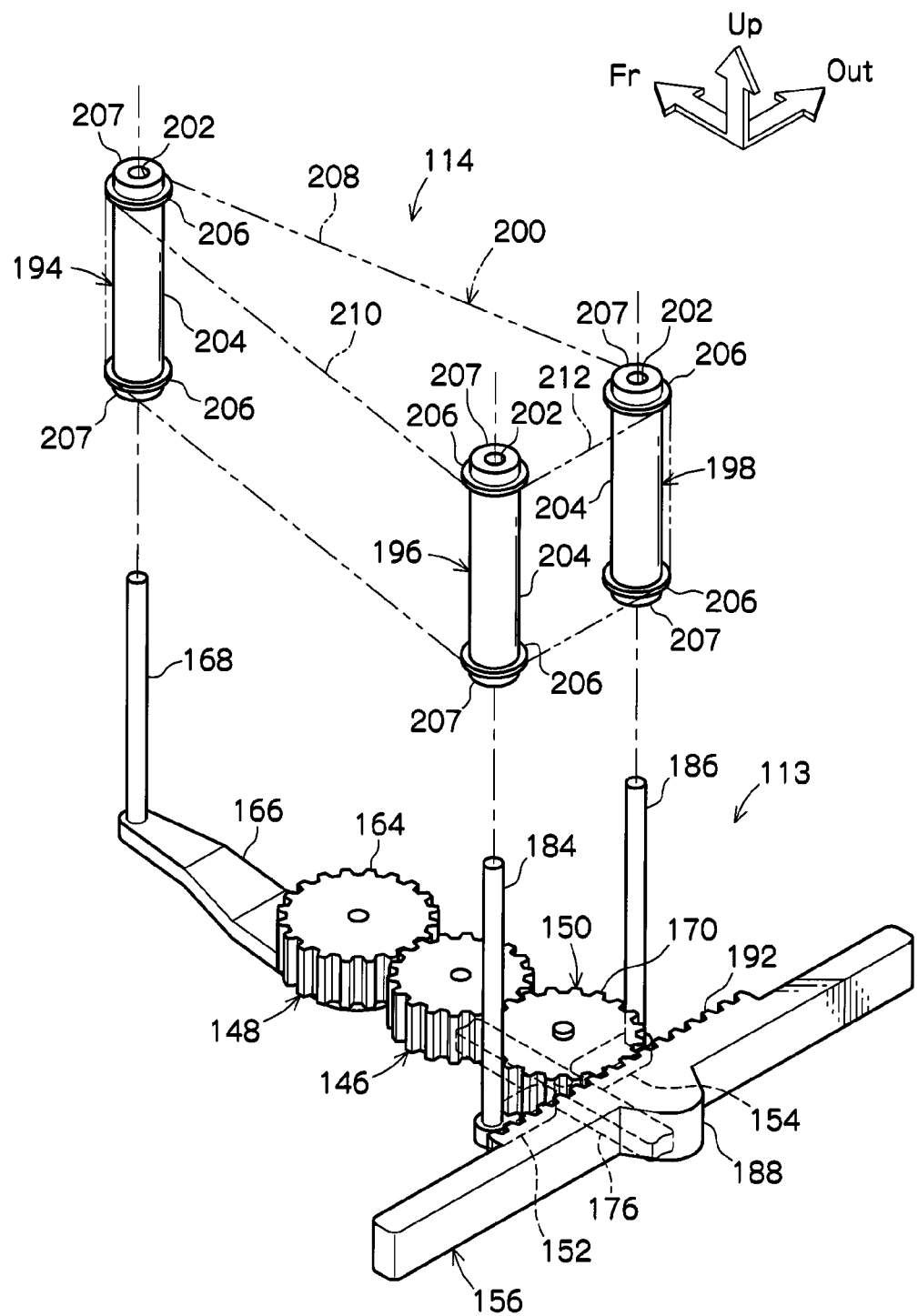
FIG. 12 is an exploded perspective view of a movable flow path member and a switching mechanism provided in the air outlet structure for an air conditioner relating to the second exemplary embodiment of the present invention.
Figure 13:
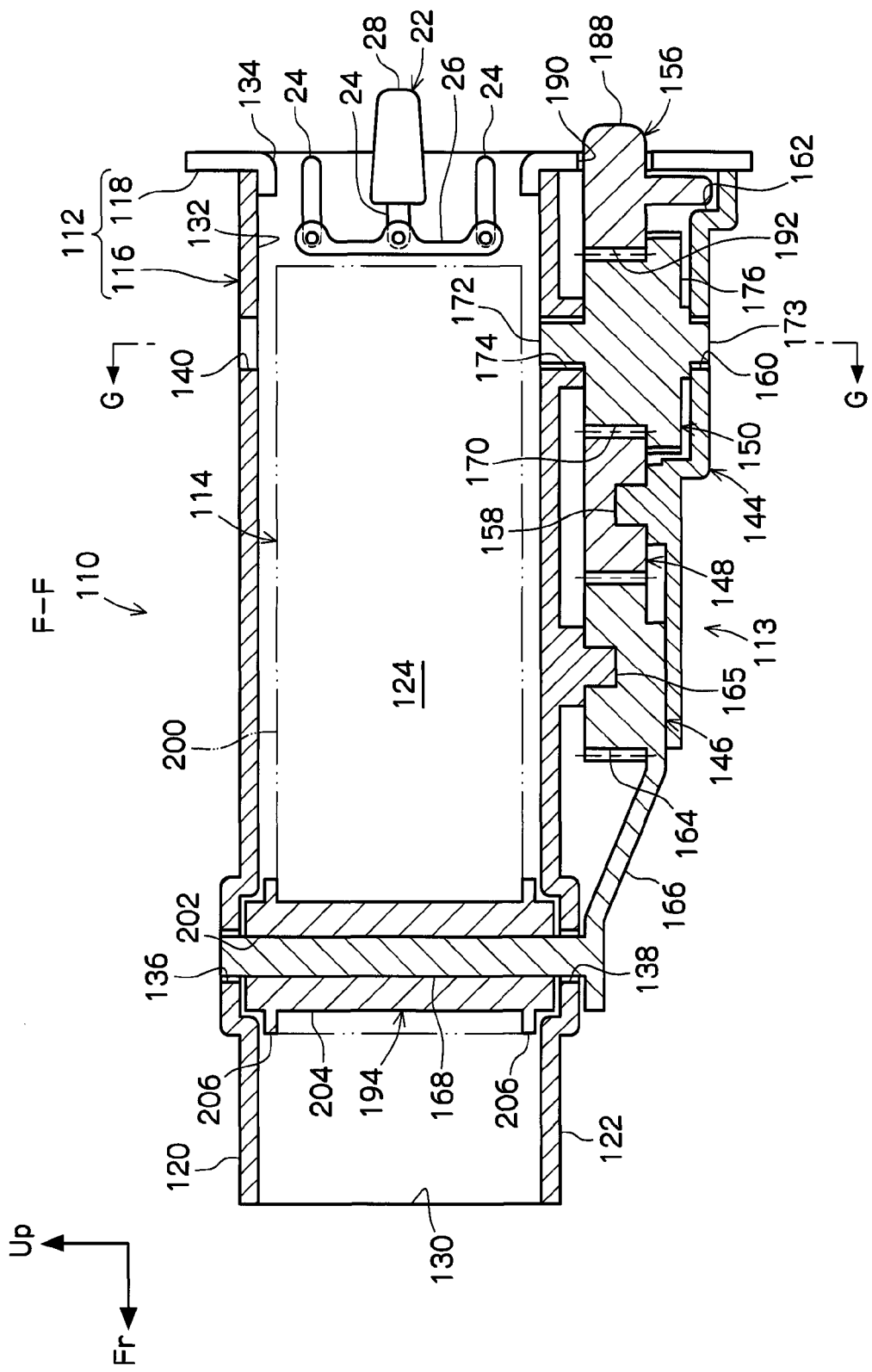
FIG. 13 is a sectional view in which the air outlet structure for an air conditioner relating to the second exemplary embodiment of the present invention is cut along line F-F of FIG. 10.

As shown in FIG. 12, the first gear 146 is structured to include a circular plate-form gear portion 164, and the gear portion 164 is turnably supported at a support protrusion 165 protruded from the lower case 122, which is shown in FIG. 13. Further, at the first gear 146, an arm portion 166 extending in the diametric direction of the gear portion 164 is provided integrally with the gear portion 164. A first pole portion 168, which extends in the vehicle vertical direction, is protruded from the arm portion 166. The first pole portion 168 is movably engaged with each of the above-mentioned first guide grooves 136 and 138 formed in the tubular case 116.

The second gear 148 is structured in a circular plate shape, and is provided at the vehicle front-rear direction rearward side relative to the first gear 146. The second gear 148 is turnably supported at the above-mentioned support protrusion 158 provided at the support plate 144, and meshes with the gear portion 164 of the first gear 146.

Figure 14:
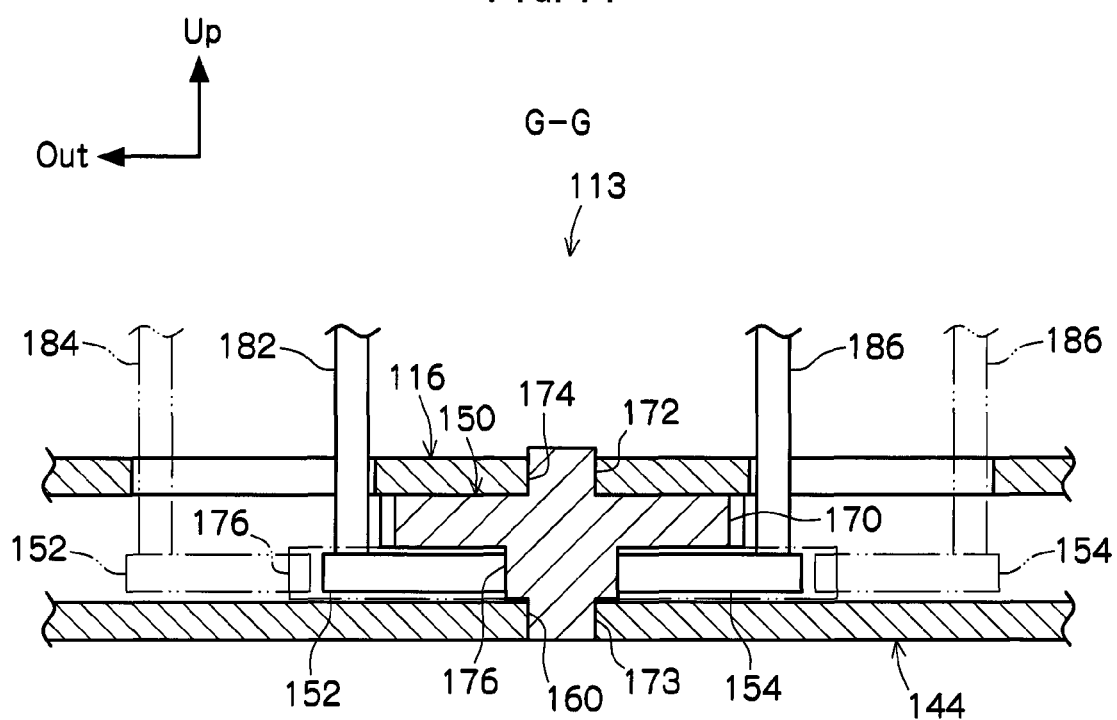
FIG. 14 is an enlarged sectional view of principal portions in which the air outlet structure for an air conditioner relating to the second exemplary embodiment of the present invention is cut along line G-G of FIG. 13.

The third gear 150 is structured to include a circular plate-form gear portion 170. As shown in FIG. 13 and FIG. 14, the gear portion 170 includes shaft portions 172 and 173 which respectively protrude in the vehicle vertical direction. Support hole portions 160 and 174 are provided at the support plate 144 and the tubular case 116, respectively. The shaft portions 172 and 173 are inserted into the support hole portions 160 and 174, respectively. Thus, the gear portion 170 is turnably supported at each of the support plate 144 and the tubular case 116.

Figure 15:
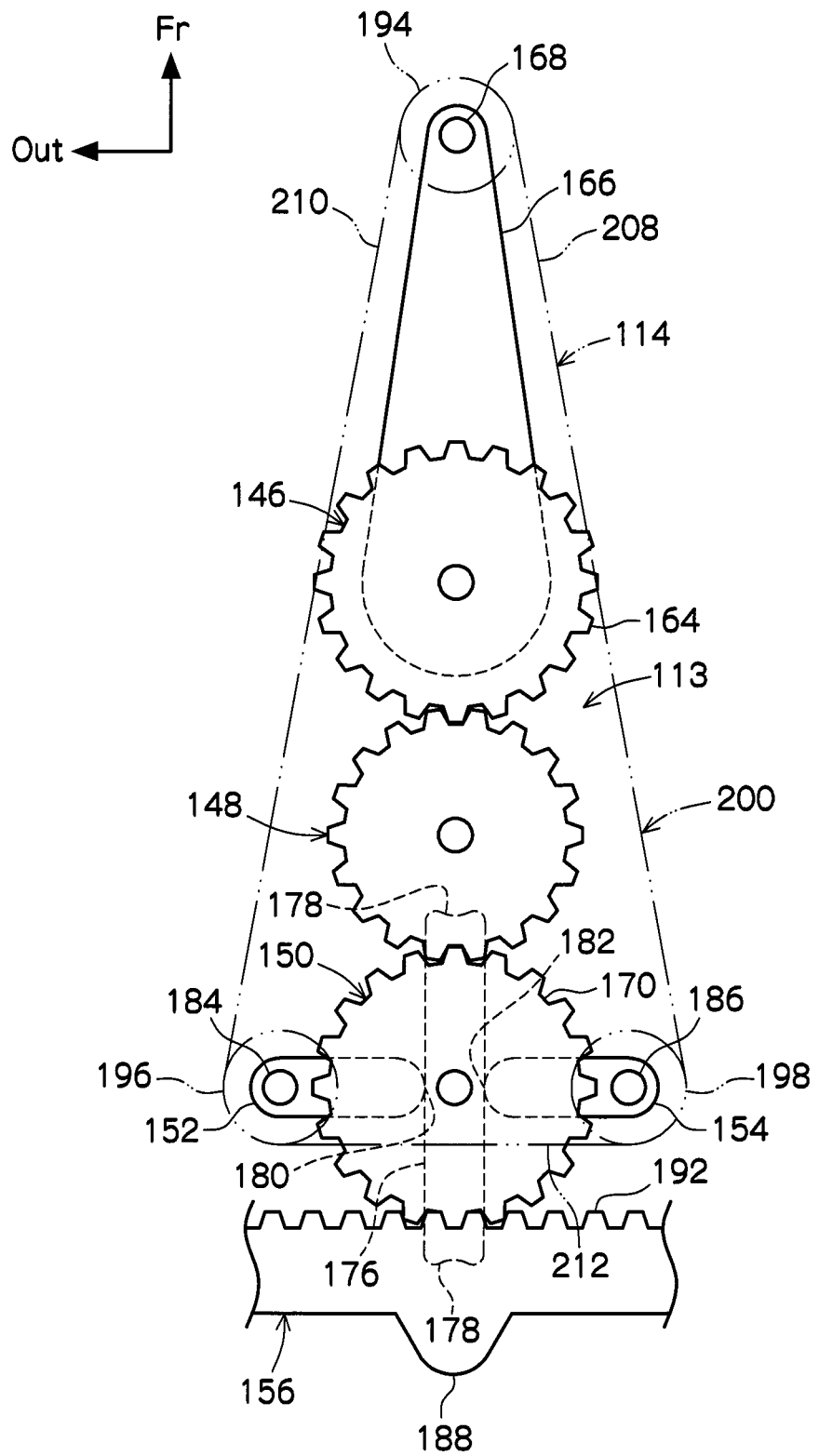
FIG. 15 is a plan view of the movable flow path member and switching mechanism provided in the air outlet structure for an air conditioner relating to the second exemplary embodiment of the present invention.

The third gear 150 is provided at the vehicle front-rear direction rearward side relative to the second gear 148, and the gear portion 170 of the third gear 150 meshes with the above-mentioned second gear 148. A guide portion 176 is provided at the third gear 150, integrally with the vehicle vertical direction lower side face of the gear portion 170. The guide portion 176 is structured in a rod shape which passes through a central portion of the gear portion 170 and extends along the diametric direction of the gear portion 170. As shown in FIG. 15, both of length direction end portions of the guide portion 176 protrude to the diametric direction outer side relative to the gear portion 170. Circular arc-form engaging recess portions 178 are formed at each of the two length direction end portions of the guide portion 176.

The pair of arms 152 and 154 are disposed at two sides in the vehicle lateral direction sandwiching the third gear 150. Vehicle lateral direction inner side regions of the arms 152 and 154 are structured as engaging protrusions 180 and 182, which are engageable with the above-mentioned engaging recess portions 178 formed in the guide portion 176. Second pole portions 184 and 186, which extend in the vehicle vertical direction, are protruded from vehicle lateral direction outer side regions of the arms 152 and 154, respectively.

The second pole portions 184 and 186 are movably engaged with, respectively, the second guide grooves 140 and 142 formed in the above-described tubular case 116. Because the second pole portions 184 and 186 are movably engaged with the second guide grooves 140 and 142, the arms 152 and 154 are movable in the vehicle lateral direction. In addition, the arms 152 and 154 are urged to sides to approach one another by unillustrated urging members. The arms 152 and 154 are supported, so as to maintain a mounted attitude extending in the vehicle lateral direction, and guided, to be slideable in the vehicle lateral direction, by the above-mentioned sliding guide wall portions 163 formed at the support plate 144.

The left-right adjustment knob 156 is constituted by a long member that extends in the vehicle lateral direction, and is supported to be slideable in the vehicle lateral direction by the above-mentioned support hole portion 162 provided at the support plate 144. A grip portion 188 is protrudingly formed at the vehicle front-rear direction rearward side (vehicle cabin side) of the left-right adjustment knob 156. This grip portion 188 is exposed to the vehicle cabin side through a long horizontal groove-form aperture portion 190 formed in the above-mentioned air outlet panel 118. A gear portion 192 along the vehicle lateral direction is formed at the vehicle front-rear direction forward side of the left-right adjustment knob 156. This gear portion 192 meshes with the above-mentioned gear portion 170 of the third gear 150.

As shown in FIG. 11, the movable flow path member 114 is disposed in the cavity portion 124 in the tubular case 116, and fulfills the function of changing the direction of the air conditioning airflow being blown out from the air outlet 134 of the air outlet panel 118 in the vehicle left-right direction, as will be described in more detail below. As shown in FIG. 12, this movable flow path member 114 is structured to include three reels 194, 196 and 198, and an endless belt 200.

The reels 194, 196 and 198 are structured by tubular bodies with long forms extending in the vehicle vertical direction, and are structured to each include a support hole 202 that penetrates in the axial direction thereof. Each of the reels 194, 196 and 198 is further structured to include a main body support portion 204 that extends in the vehicle vertical direction, a detachment prevention portion 206 with a broader diameter than the main body support portion 204 at each of the length direction ends of the main body support portion 204, and a support protrusion portion 207 provided at each of the two length direction end portions.

At the reel 194 (a first support shaft portion) the aforementioned first pole portion 168 is inserted into the support hole 202. Thus, the reel 194 is rotatably supported at the first pole portion 168. At the pair of reels 196 and 198 (a pair of second support shaft portions) the aforementioned second pole portions 184 and 186 are inserted into the respective support holes 202. Thus, the pair of reels 196 and 198 are rotatably supported at the second pole portions 184 and 186, respectively.

The support protrusion portions 207 provided at the two length direction end sides of the reel 194 are movably inserted into, respectively, the above-mentioned first groove portions 135 and 137 provided at the tubular case 116 (see FIG. 11), and the support protrusion portions 207 provided at the two length direction end sides of the reels 196 and 198 are respectively movably inserted into the above-mentioned second groove portions 137 and 139 provided at the tubular case 116 (see FIG. 11). As shown in FIG. 11, the pair of reels 196 and 198 are disposed at the air outlet panel 118 side relative to the reel 194.

The endless belt 200 is constituted of, for example, a rubber having extensibility or the like. The endless belt 200 has a dimension of width (in the vehicle vertical direction length) substantially the same as a length direction dimension of the main body support portions 204 provided at the reels 194, 196 and 198. The endless belt 200 is wound round and supported by the main body support portions 204 of the three reels 194, 196 and 198. Here, because the detachment prevention portions 206 are provided at the two length direction end sides of the main body support portion 204 at each of the reels 194, 196 and 198, the endless belt 200 is prevented from disengaging from the main body support portions 204 of the reels 194, 196 and 198, and is reliably supported. Further, in the state in which the endless belt 200 is wound round the three reels 194, 196 and 198, the endless belt 200 is structured in a triangular shape in plan view, with the three reels 194, 196 and 198 serving as vertices and having wall portions 208, 210 and 212 at three edges.

The whole of the movable flow path member 114 constituted to include this endless belt 200 is a structure that receives a control force from the above-mentioned switching mechanism 113 and changes shape, as described following. That is, as shown in FIG. 15, when the left-right adjustment knob 156 is disposed centrally, the third gear 150 meshing with the gear portion 192 of the left-right adjustment knob 156 is disposed at an intermediate position, and is in a state in which the guide portion 176 of the third gear 150 extends along the vehicle front-rear direction. In this state, the pair of arms 152 and 154 are urged by the unillustrated urging members and are disposed at sides close to one another, and the pair of reels 196 and 198 supported at the second pole portions 184 and 186 of the arms 152 and 154 are also in a state of being disposed at sides close to one another.

Figure 18:
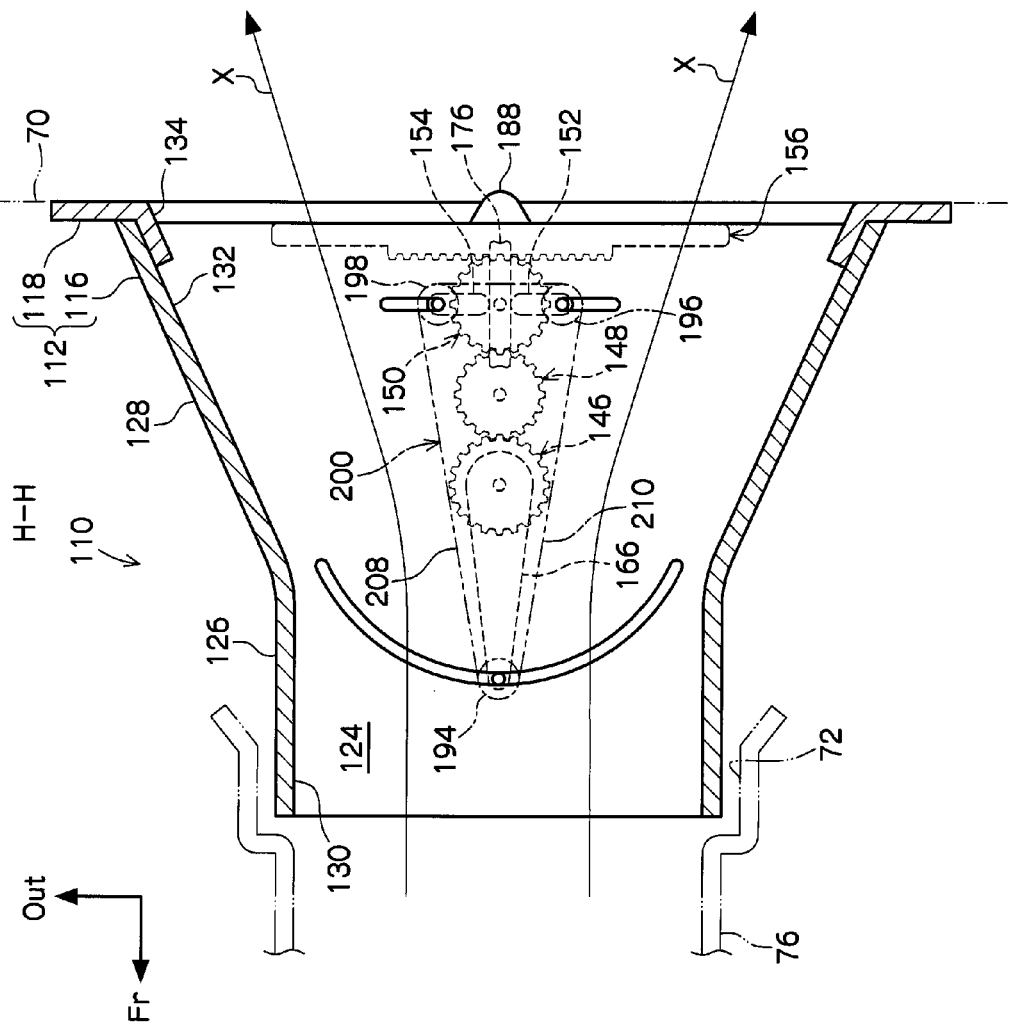
FIG. 18 is a sectional view in which the air outlet structure for an air conditioner relating to the second exemplary embodiment of the present invention is cut along line H-H of FIG. 10.

Furthermore, the first gear 146 that meshes with the third gear 150 via the second gear 148 is disposed at an intermediate position, and the arm portion 166 formed at the first gear 146 is in a state of extending along the vehicle front-rear direction. The reel 194 supported at the first pole portion 168 of the arm portion 166 is in the state of being disposed at an intermediate position in the direction (in this case, the vehicle lateral direction) orthogonal to the direction of flow of the case 112, as shown in FIG. 18. Therefore, the whole movable flow path member 114 is in an isosceles triangular form which is long in the direction of flow of the case 112 (the first state relating to the present invention).

Further, at this time, the wall portion 208 and the wall portion 210 of the endless belt 200 wound round the reels 194, 196 and 198 form a shape that tapers from the downstream side toward the upstream side of the direction of flow of the case 112, and the pair of wall portions 208 and 210 are substantially parallel with the direction of flow of the case 112 in front of the air outlet 134. Thus, the whole movable flow path member 114 is in a state which is thin in the direction orthogonal to the direction of flow of the case 112. Moreover, at this time, the whole movable flow path member 114 divides the flow path in the case 112 in two in the direction orthogonal to the direction of flow of the case 112.

Figure 16:
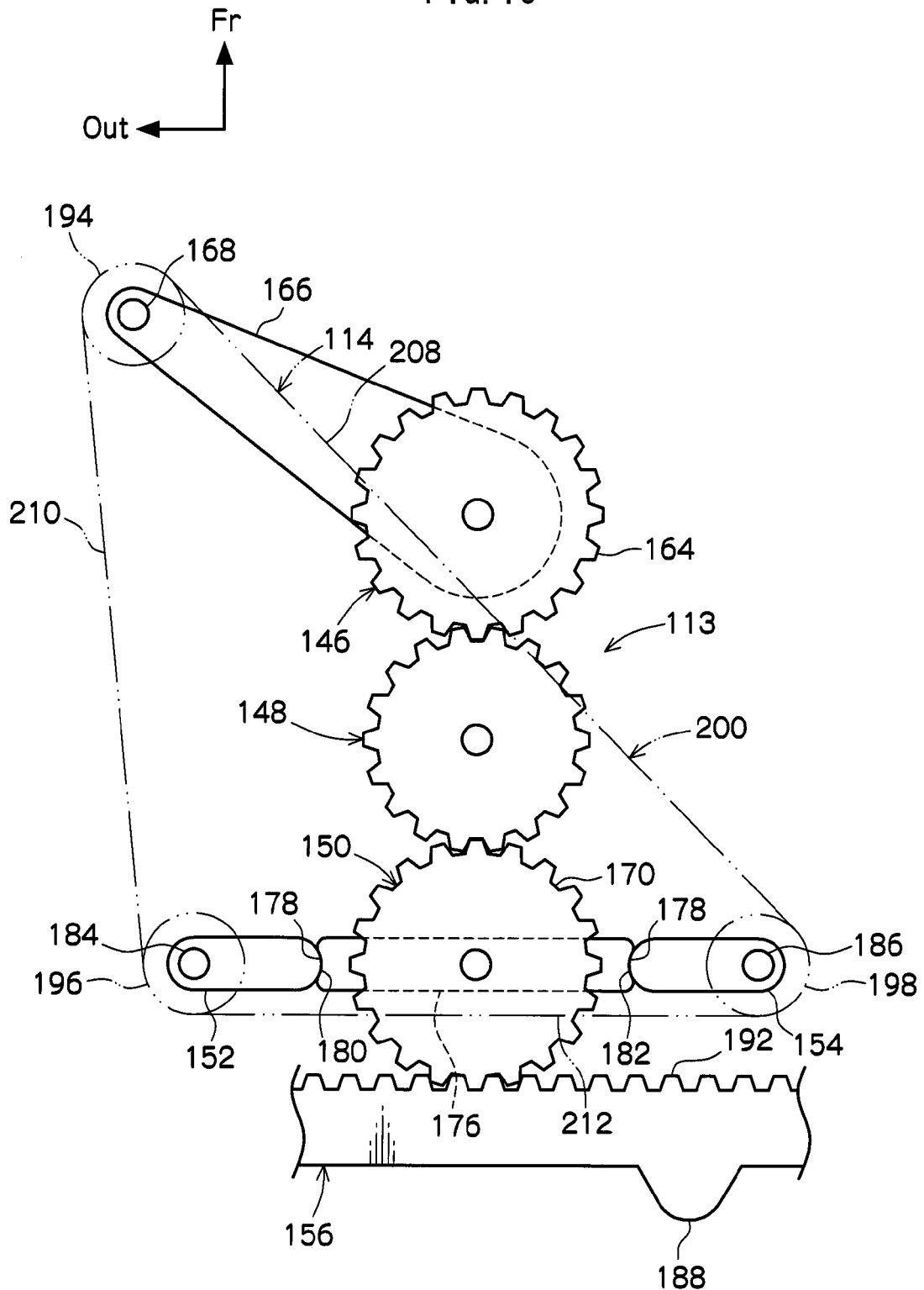
FIG. 16 is an operation description view of the movable flow path member and switching mechanism provided in the air outlet structure for an air conditioner relating to the second exemplary embodiment of the present invention.
Figure 17:
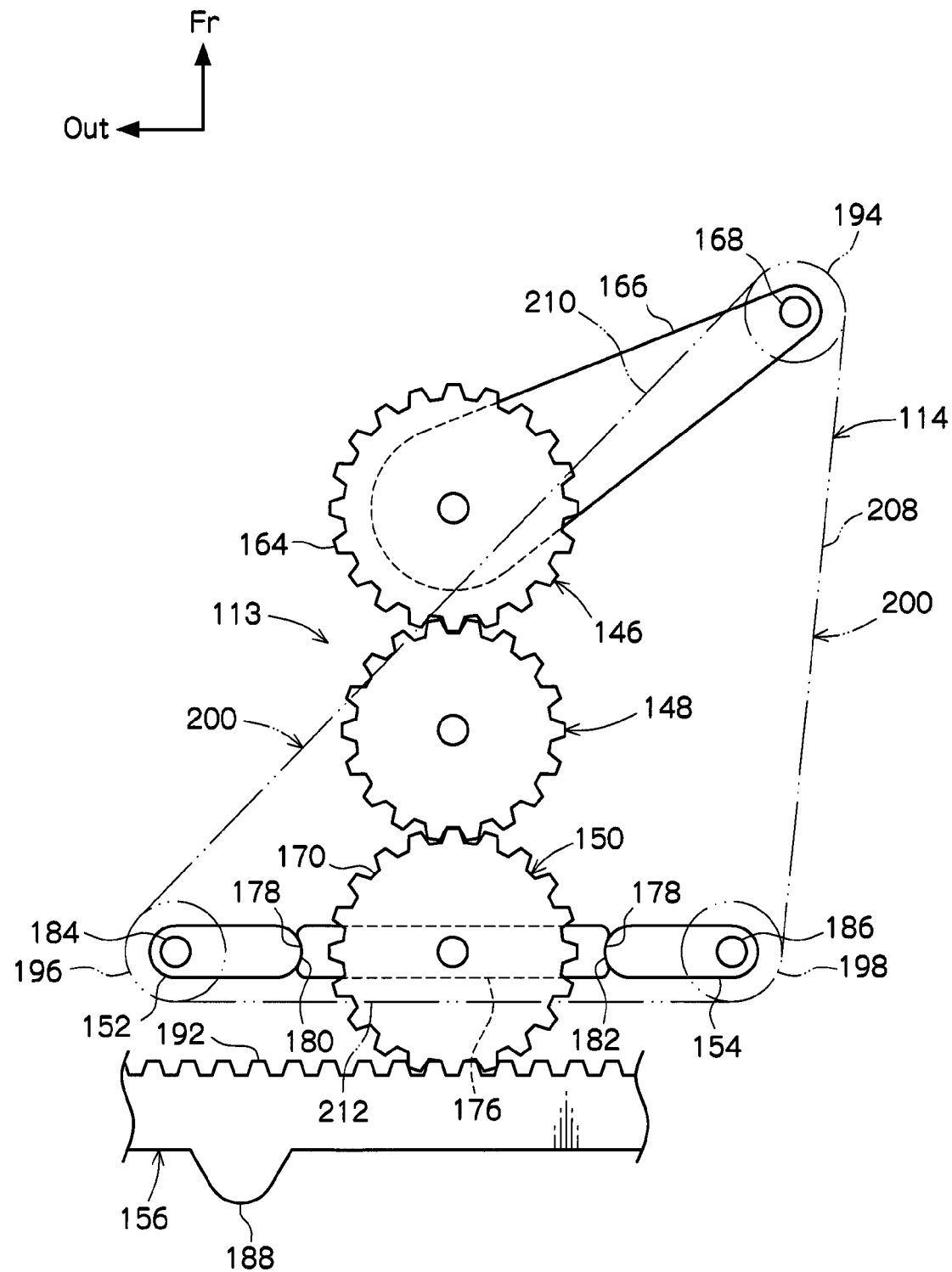
FIG. 17 is an operation description view of the movable flow path member and switching mechanism provided in the air outlet structure for an air conditioner relating to the second exemplary embodiment of the present invention.

On the other hand, when the left-right adjustment knob 156 is slid to the right end side, as shown in FIG. 16, the third gear 150 meshing with the gear portion 192 of the left-right adjustment knob 156 is turned one way and the guide portion 176 of the third gear 150 is turned. At this time, in accordance with the turning, the guide portion 176 pushes apart and displaces the pair of arms 152 and 154 to sides away from one another. Hence, when the guide portion 176 is in a state of extending along the vehicle lateral direction, the engaging protrusions 180 and 182 formed at the vehicle lateral direction inner side regions of the arms 152 and 154 are engaged with the engaging recess portions 178 formed at the length direction two end portions of the guide portion 176. Thus, the pair of arms 152 and 154 are displaced to sides away from one another, and the pair of reels 196 and 198 supported at the second pole portions 184 and 186 of the arms 152 and 154 are also in a state of being displaced to sides away from one another.

Figure 19:
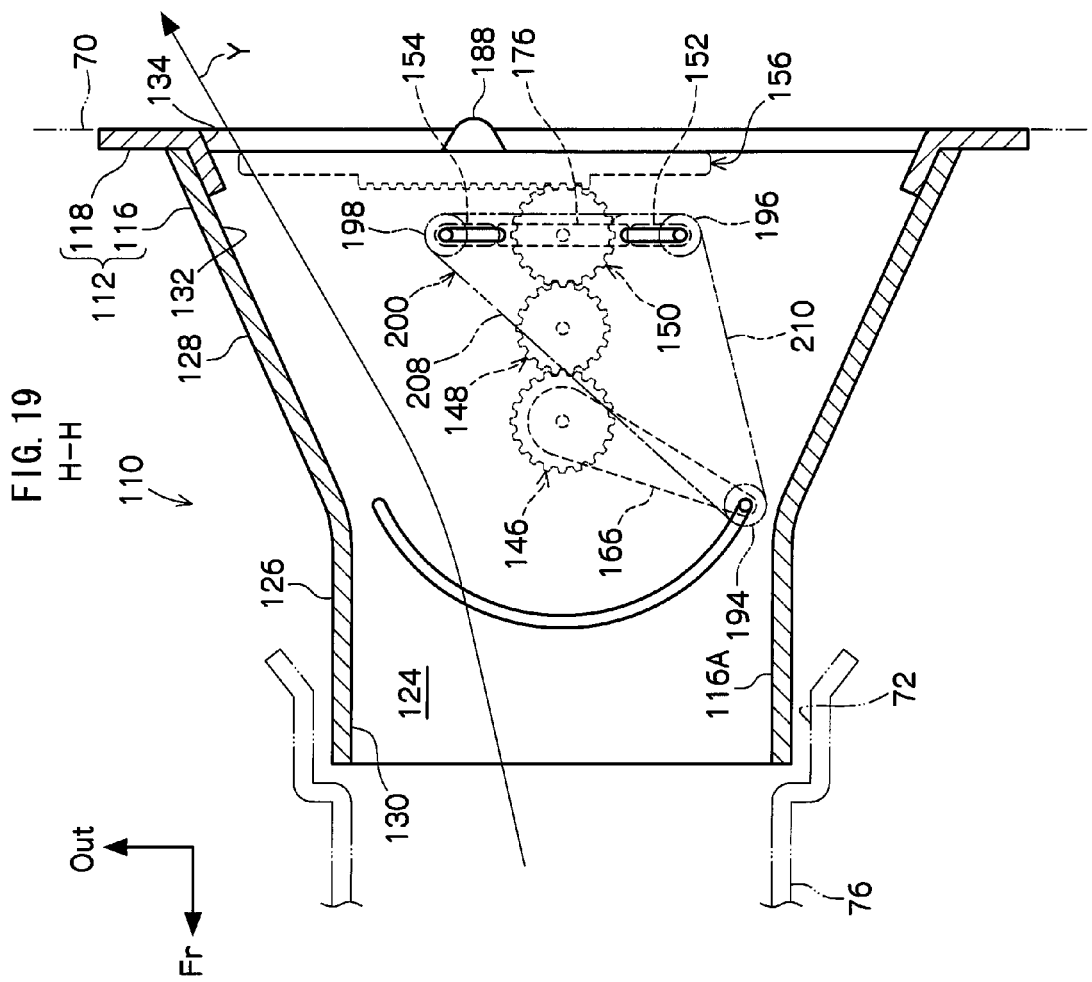
FIG. 19 is an operation description view of the air outlet structure for an air conditioner relating to the second exemplary embodiment of the present invention.

Moreover, at this time, the first gear 146, which meshes with the third gear 150 via the second gear 148, is turned one way, and the arm portion 166 formed at the first gear 146 goes into an angled state relative to the direction of flow of the case 112. The reel 194 supported at the first pole portion 168 of the arm portion 166 is in a state of being disposed at one end side (the left side) of the direction orthogonal to the direction of flow of the case 112, as shown in FIG. 19. Therefore, the whole movable flow path member 114 is in a triangular form of which the vertex disposed at the upstream side is displaced to one end side (the left side) of the direction orthogonal to the direction of flow of the case 112 (the second state relating to the present invention).

Further, at this time, the wall portion 208 of the endless belt 200 is in an angled state relative to the direction of flow of the case 112. Thus, the movable flow path member 114 changes the shape of the flow path itself within the case 112, and changes the direction of the air conditioning airflow blown out from the air outlet 134 to the vehicle rightward direction. At this time, a portion at the upstream side of the movable flow path member 114 approaches a side wall portion 116A of the tubular case 116, and the side wall portion 116A of the tubular case 116 and the wall portion 208 of the endless belt 200 structure a continuous wall face.

Figure 20:
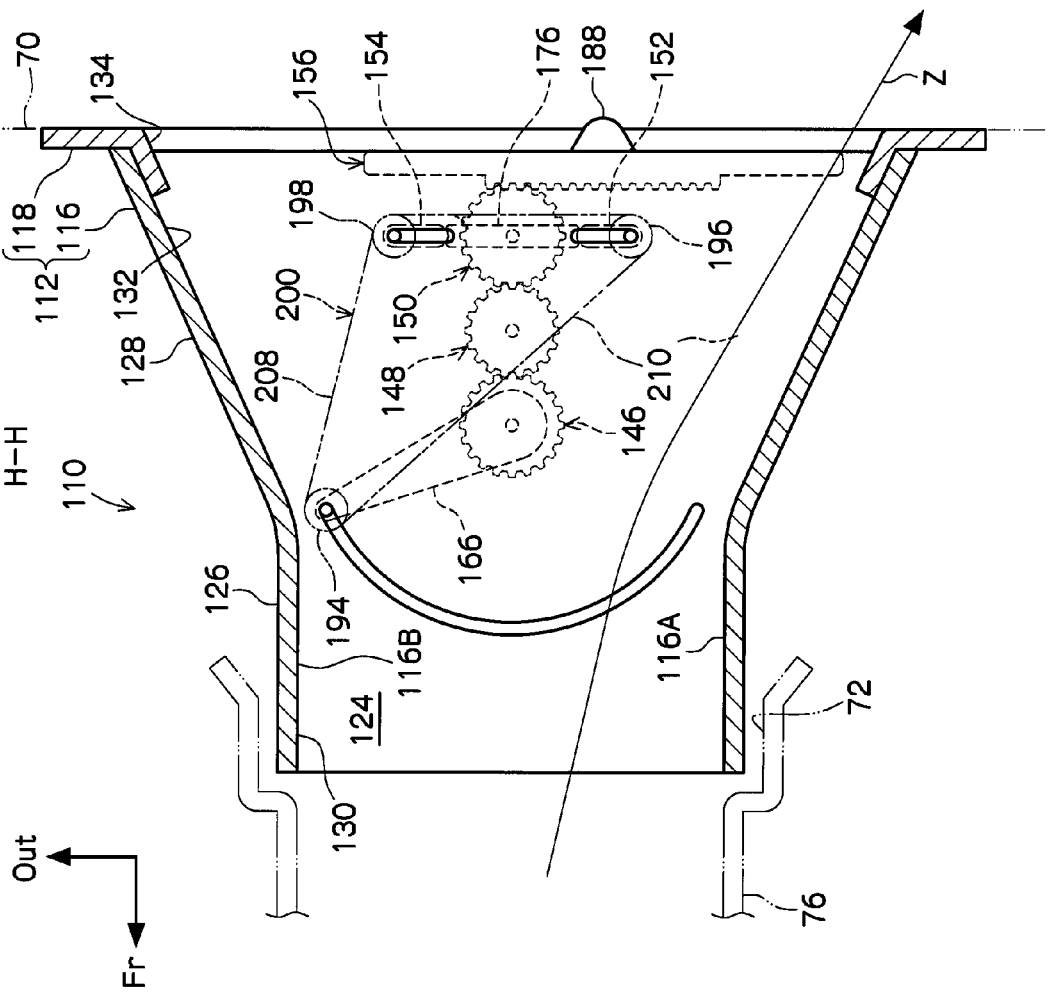
FIG. 20 is an operation description view of the air outlet structure for an air conditioner relating to the second exemplary embodiment of the present invention.

Similarly, when the left-right adjustment knob 156 is slid to the left end side, as shown in FIG. 20, the whole movable flow path member 114 is in a triangular form of which the vertex disposed at the upstream side is displaced to the other end side (the right side) of the direction orthogonal to the direction of flow of the case 112. At this time, the wall portion 210 of the endless belt 200 is in the angled state relative to the direction of flow of the case 112. Thus, the movable flow path member 114 changes the shape of the flow path itself within the case 112, and changes the direction of the air conditioning airflow blown out from the air outlet 134 to the vehicle leftward direction. At this time, the upstream side portion of the movable flow path member 114 approaches a side wall portion 116B of the tubular case 116, and the side wall portion 116B of the tubular case 116 and the wall portion 210 of the endless belt 200 structure a continuous wall face.

Next, operation of the air outlet structure 110 for an air conditioner relating to the second exemplary embodiment of the present invention will be described.

In the air outlet structure 110 for an air conditioner of the second exemplary embodiment of the present invention, when an air conditioning airflow is being blown out from an unillustrated air outlet of the air conditioner, the air conditioning airflow passes through the tubular case 116 and is blown out through the air outlet 134 of the air outlet panel 118. At this time, as shown in FIG. 18, if the left-right adjustment knob 156 is disposed at the central position, the whole movable flow path member 114 forms the isosceles triangular shape that is long in the direction of flow of the tubular case 116 as described above. At this time, the wall portions 208 and 210 of the endless belt 200 of the movable flow path member 114 are substantially parallel with the direction of flow of the case 112 in front of the air outlet 134. Therefore, an air conditioning airflow X toward the front face of the instrument panel 70 is blown out from the air outlet 134.

Further, at this time, because the wall portion 208 and wall portion 210 of the endless belt 200 wound round the reels 194, 196 and 198 form the shape that tapers from the downstream side toward the upstream side of the direction of flow of the case 112 and the pair of wall portions 208 and 210 are substantially parallel with the direction of flow of the case 112 in front of the air outlet 134, the whole movable flow path member 114 is in a state of being thin in the direction orthogonal to the direction of flow of the case 112. Therefore, an effective cross-sectional area in the case 112 is ensured, and an air conditioning airflow with sufficient volume and speed from the air outlet 134 is obtained.

Moreover, at this time, the whole movable flow path member 114 divides the flow path in the case 112 in two in the direction orthogonal to the direction of flow. Therefore, the air conditioning airflow can be caused to blow out toward a wide range of front directions by the movable flow path member 114. Thus, a comparatively gentle air conditioning airflow can ventilate into the vehicle interior.

On the other hand, if the left-right adjustment knob 156 is disposed at a position at the left end side as shown in FIG. 19, then as described above, the whole movable flow path member 114 forms the triangular shape in which the vertex disposed at the upstream side is displaced to the one end side (the left side) in the direction orthogonal to the direction of flow of the case 112. At this time, the wall portion 208 of the endless belt 200 is in the angled state relative to the direction of flow of the case 112. Thus, the movable flow path member 114 changes the shape of the flow path itself within the case 112, and changes the direction of the air conditioning airflow blown out from the air outlet 134 to the vehicle rightward direction. Therefore, an air conditioning airflow Y with a high directivity to the vehicle rightward direction is blown out from the air outlet 134.

Further, at this time, the upstream side portion of the movable flow path member 114 approaches the side wall portion 116A of the tubular case 116, and the side wall portion 116A of the tubular case 116 and the wall portion 208 of the endless belt 200 structure the continuous wall face. Therefore, an effective cross-sectional area in the case 112 is ensured, and an air conditioning airflow with sufficient volume and speed from the air outlet 134 is obtained.

Similarly, when the left-right adjustment knob 156 is disposed at a position at the left end side as shown in FIG. 20, as described above, the whole movable flow path member 114 forms the triangular shape in which the vertex disposed at the upstream side is displaced to the other end side (the right side) in the direction orthogonal to the direction of flow of the case 112. At this time, the wall portion 210 of the endless belt 200 is in the angled state relative to the direction of flow of the case 112. Thus, the movable flow path member 114 changes the shape of the flow path itself within the case 112, and changes the direction of the air conditioning airflow blown out from the air outlet 134 to the vehicle leftward direction. Therefore, an air conditioning airflow Z with a high directivity to the vehicle leftward direction is blown out from the air outlet 134.

Further, at this time, the upstream side portion of the movable flow path member 114 approaches the side wall portion 116B of the tubular case 116, and the side wall portion 116B of the tubular case 116 and the wall portion 210 of the endless belt 200 structure the continuous wall face. Therefore, an effective cross-sectional area in the case 112 is ensured, and an air conditioning airflow with sufficient volume and speed from the air outlet 134 is obtained.

Now, operation of the air outlet structure 110 for an air conditioner relating to the second exemplary embodiment of the present invention will be further clarified while being compared with the comparative example. As described for the above-described first exemplary embodiment, when the fins 84 for changing the left-right blowing direction are plurally provided in the case 82 as in the air outlet structure 80 for an air conditioner relating to the comparative example shown in FIG. 21, the plural fins 84 are disposed in the flow path. Therefore, the actual outlet area of the air outlet 82A is reduced by these fins 84. Moreover, when the fins 84 are maximally angled to change the direction of the air conditioning airflow, as shown by the imaginary lines, the region A is formed in which the air conditioning airflow in the flow path is held back by the fin 84, of the plural fins 84, that is disposed close to the flow path wall surface 82B, and the actual outlet area of the air outlet 82A is reduced. Accordingly, because the actual outlet area of the air outlet 82A is reduced, volume and speed of the air conditioning airflow are insufficient. To have sufficient volume and speed of the air conditioning airflow, it is necessary to enlarge the air outlet 82A. However, if the air outlet 82A is enlarged, it is difficult to form the air outlet 82A into a structure that is thin in the vehicle vertical direction and left-right direction.

In contrast, according to the air outlet structure 110 for an air conditioner relating to the second exemplary embodiment of the present invention, as described above, the movable flow path member 114 provided in the case 112 deforms in accordance with operation of the left-right adjustment knob 156, and the shape of the flow path itself within the case 112 changes. Thus, there is no need to provide a plurality fins for changing the left-right blowing direction (corresponding to the fins 84 of the comparative example) in the flow path in the case 112. Therefore, the effective cross-sectional area of the flow path in the case 112 can be ensured, and the volume and speed of the air conditioning airflow can be sufficiently ensured.

Further, because the direction of the air conditioning airflow from the air outlet 134 can be controlled by changing the shape of the flow path itself within the case 112, an air conditioning airflow with excellent directivity can be obtained. Moreover, because the effective cross-sectional area of the flow path in the case 112 can be ensured as mentioned above, the air outlet 134 into the vehicle interior can be formed with a structure thinner in the vehicle vertical direction or the vehicle left-right direction than the structure of the comparative example. Therefore, a degree of freedom of design of the instrument panel 70 can be improved.

Further, in the air outlet structure 110 for an air conditioner relating to the second exemplary embodiment of the present invention, as described above, the upstream side portion of the movable flow path member 114 displaces in the direction (in this case, the vehicle lateral direction) orthogonal to the direction of flow of the case 112 in accordance with operation of the left-right adjustment knob 156, and thus the shape of the flow path in the case 112 is changed. Therefore, the shape of the flow path in the case 112 can be considerably changed as described above and, accordingly, the direction of the air conditioning airflow can be considerably switched.

Further, in the air outlet structure 110 for an air conditioner relating to the second exemplary embodiment of the present invention, when the left-right adjustment knob 156 is disposed at the central position and the whole movable flow path member 114 forms an isosceles triangle that is long in the direction of flow of the case 112, the air conditioning airflow can be caused to blow out toward a wide range of front directions by the movable flow path member 114. Thus, a comparatively gentle air conditioning airflow can ventilate into the vehicle interior.

Further, in the air outlet structure 110 for an air conditioner relating to the second exemplary embodiment of the present invention, as described above, there is no need to provide a plurality fins for changing the left-right blowing direction in the flow path in the case 112. Therefore, the generation of noise by fins in the case 112 interfering with the air conditioning airflow can be prevented.

Next, variant examples of the air outlet structure 110 for an air conditioner relating to the second exemplary embodiment of the present invention will be described.

In the exemplary embodiment described above, the air outlet structure 110 for an air conditioner is used for changing the direction of an air conditioning airflow in the vehicle left-right direction. However, the air outlet structure 110 for an air conditioner may be used for changing the direction of an air conditioning airflow in the vehicle vertical direction.

Further, in the exemplary embodiment described above, the movable flow path member 114 is structured to be provided with the three reels 194, 196 and 198 for supporting the endless belt 200 and is formed in a triangular shape in plan view. However, the movable flow path member 114 may be structured to be provided with three or more reels and formed in a polygonal shape in plan view.

The invention claimed is:

1. An air outlet structure for an air conditioner, comprising:
a flow path member having a downstream end that is open to serve as an air outlet configured to blow an air conditioning airflow to a vehicle interior; and
a movable flow path member that is provided inside the flow path member, which changes a shape of a flow path in the flow path member by receiving a control force and is displaced in a direction orthogonal to a direction of flow of the flow path member while deforming, and causes the air conditioning airflow to blow from the air outlet in a direction corresponding to the shape of the flow path,
wherein the movable flow path member causes the air conditioning airflow to blow in a first direction when disposed at one end side in the direction orthogonal to the direction of flow of the flow path member, causes the air conditioning airflow to blow in a second direction when disposed at another end side in the direction orthogonal to the direction of flow of the flow path member, and divides the flow path in the flow path member in two in the direction orthogonal to the direction of flow when disposed at an intermediate position in the direction orthogonal to the direction of flow of the flow path member.

2. An air outlet structure for an air conditioner, comprising:
a flow path member having a downstream end that is open to serve as an air outlet configured to blow an air conditioning airflow to a vehicle interior; and
a movable flow path member that is provided inside the flow path member, which changes a shape of a flow path in the flow path member by receiving a control force and is displaced in a direction orthogonal to a direction of flow of the flow path member while deforming, and causes the air conditioning airflow to blow from the air outlet in a direction corresponding to the shape of the flow path,
wherein the movable flow path member is provided with:
a first wall portion that extends in a direction orthogonal to a direction of flow of the flow path member, receives the control force and is slid in the direction orthogonal to the direction of flow of the flow path member;
a pair of second wall portions that are respectively turnably joined to a different one of two sliding direction end sides of the first wall portion; and
a pair of third wall portions, respectively having one end side turnably joined to a side of a different one of the pair of second wall portions that is opposite to respective joining portions with the first wall portion, with another end side of each of the pair of third wall portions being turnably joined to one another,
the movable flow path member being configured to form:
a first state, in which a triangle is formed, respective sides of which are configured by the first wall portion together with the pair of second wall portions, and each of the pair of third wall portions; and
a second state, in which a pentagon is formed by the first wall portion, each of the pair of second wall portions, and each of the pair of third wall portions; and
the air outlet structure includes a switching unit that switches the movable flow path member between the first state and the second state in accordance with a sliding position of the first wall portion.

* * * * *